US012677991B2

(12) United States Patent
Shi et al.

(10) Patent No.: US 12,677,991 B2
(45) Date of Patent: Jul. 14, 2026

(54) FOOD PROCESSOR BLADE LOCK MECHANISM

(71) Applicant: SharkNinja Operating LLC, Needham, MA (US)

(72) Inventors: Ming Li Shi, Shenzhen (CN); Kai Ping Hu, Shenzhen (CN); Xu Sheng Deng, HuiZhou (CN); Nathan Lyell, Woking (GB); Jonathan James, Witney (GB)

(73) Assignee: SharkNinja Operating LLC, Needham, MA (US)

( * ) Notice: Subject to any disclaimer, the term of this patent is extended or adjusted under 35 U.S.C. 154(b) by 319 days.

(21) Appl. No.: 18/541,432

(22) Filed: Dec. 15, 2023

(65) Prior Publication Data

US 2025/0160573 A1      May 22, 2025

Related U.S. Application Data

(60) Provisional application No. 63/601,580, filed on Nov. 21, 2023.

(51) Int. Cl.
A47J 43/07          (2006.01)
A47J 43/044          (2006.01)

(52) U.S. Cl.
CPC .... *A47J 43/0711* (2013.01); *A47J 2043/0449* (2013.01)

(58) Field of Classification Search
CPC ........... A47J 43/0711; A47J 2043/0449; E05B 17/2011; E05B 63/121; E05B 67/365
USPC .......................................................... 70/182
See application file for complete search history.

(56) References Cited

U.S. PATENT DOCUMENTS

| | | | |
|---|---|---|---|
| 2,626,133 A | 1/1953 | Reed | |
| 2,719,494 A | 10/1955 | Spiess, Jr. et al. | |
| 2,889,949 A | 6/1959 | Morris | |
| 3,001,770 A | 9/1961 | Mueller | |
| 4,296,689 A * | 10/1981 | Hardesty | F42C 15/20 |
| | | | 102/260 |
| 4,325,643 A * | 4/1982 | Scott | A47J 43/0755 |
| | | | 241/101.1 |
| 4,420,948 A | 12/1983 | Savage | |
| 4,668,561 A | 5/1987 | Ney | |
| 4,693,611 A | 9/1987 | Verkler | |
| 4,707,997 A | 11/1987 | Bigler et al. | |
| 4,828,398 A | 5/1989 | Verkler | |
| 4,861,255 A | 8/1989 | Ney | |

(Continued)

FOREIGN PATENT DOCUMENTS

| | | |
|---|---|---|
| CN | 102160593 A | 8/2011 |
| CN | 107125424 A | 9/2017 |

(Continued)

*Primary Examiner* — Nathan Cumar
(74) *Attorney, Agent, or Firm* — The Webb Law Firm

(57)          ABSTRACT

A system and method locks a processing shaft of a food processor to a blade during processing. The system includes a coupling with at least one socket. The coupling can be connected to move with the blade or the processing shaft. At least one ball bearing is positioned within a corresponding socket in a first configuration when the blade is not locked. As the processing shaft moves from the first configuration to a second configuration, each ball bearing moves from a corresponding socket into a cavity of the blade or a recess of the processing shaft, thereby locking the blade to the processing shaft.

20 Claims, 21 Drawing Sheets

(56)  References Cited

U.S. PATENT DOCUMENTS

| | | | |
|---|---|---|---|
| 4,974,965 | A | 12/1990 | Heinhold et al. |
| 5,208,050 | A | 5/1993 | Ney |
| 5,366,286 | A | 11/1994 | Rüttimann |
| 5,400,614 | A | 3/1995 | Feola |
| 5,428,873 | A * | 7/1995 | Hitchcock .......... E05B 47/0002 |
| | | | 24/607 |
| 5,463,878 | A | 11/1995 | Parekh et al. |
| 5,771,742 | A * | 6/1998 | Bokaie ..................... B64G 1/22 |
| | | | 337/140 |
| 5,863,118 | A | 1/1999 | Ackels et al. |
| 5,893,485 | A | 4/1999 | McGill |
| 5,918,767 | A | 7/1999 | McGill |
| 6,068,160 | A | 5/2000 | Fancher |
| 6,119,905 | A | 9/2000 | Cocchi et al. |
| 6,435,377 | B1 | 8/2002 | Iwata et al. |
| 6,553,779 | B1 | 4/2003 | Boyer et al. |
| 6,817,749 | B2 | 11/2004 | Saunders et al. |
| 7,017,783 | B1 | 3/2006 | Hunter et al. |
| 7,278,555 | B2 | 10/2007 | McGill |
| 7,677,485 | B2 * | 3/2010 | Gursel ................ A47J 43/0722 |
| | | | 241/292.1 |
| 7,861,890 | B2 | 1/2011 | McGill |
| 8,196,782 | B2 | 6/2012 | De Blasi |
| 8,297,182 | B2 | 10/2012 | Cocchi et al. |
| 8,561,839 | B2 | 10/2013 | Cocchi et al. |
| 8,616,250 | B2 | 12/2013 | Herbert |
| 8,887,522 | B2 | 11/2014 | Grampassi |
| 9,560,865 | B2 | 2/2017 | Cocchi et al. |
| 10,694,764 | B2 | 6/2020 | Zappoli et al. |
| 11,064,715 | B2 | 7/2021 | Herbert et al. |
| 11,102,992 | B2 | 8/2021 | Douer |
| 11,134,703 | B2 | 10/2021 | Cocchi et al. |
| 11,185,091 | B2 | 11/2021 | Koehl et al. |
| 11,259,542 | B2 | 3/2022 | Jacob et al. |
| 11,486,631 | B2 | 11/2022 | Fonte et al. |
| 11,503,959 | B2 * | 11/2022 | Proulx ................ A47J 43/0705 |
| 11,528,922 | B2 | 12/2022 | Beth Halachmi |
| 11,622,568 | B2 | 4/2023 | Kaliszewski et al. |
| 11,627,747 | B2 | 4/2023 | Fonte et al. |
| 11,672,382 | B2 * | 6/2023 | He .......................... A23G 9/22 |
| | | | 241/30 |
| 2004/0161503 | A1 | 8/2004 | Malone et al. |
| 2005/0173462 | A1 | 8/2005 | Stumler et al. |
| 2005/0183426 | A1 | 8/2005 | Learned |
| 2006/0169727 | A1 | 8/2006 | Cocchi et al. |
| 2007/0110872 | A1 | 5/2007 | Gerber |
| 2007/0199614 | A1 | 8/2007 | Cocchi et al. |
| 2010/0116846 | A1 | 5/2010 | Cortese et al. |
| 2010/0147875 | A1 | 6/2010 | Santos et al. |
| 2012/0205395 | A1 | 8/2012 | McGill |
| 2013/0008008 | A1 * | 1/2013 | Holcomb ................ E05B 15/04 |
| | | | 29/428 |
| 2016/0213199 | A1 * | 7/2016 | Hensel ................ A47J 43/0772 |
| 2016/0255859 | A1 | 9/2016 | Salerno |
| 2016/0345605 | A1 | 12/2016 | McGill et al. |
| 2019/0008181 | A1 | 1/2019 | Scott et al. |
| 2019/0053515 | A1 | 2/2019 | Stojkovski et al. |
| 2020/0260756 | A1 | 8/2020 | Crundwell et al. |
| 2021/0068419 | A1 | 3/2021 | Spirk et al. |
| 2022/0110339 | A1 | 4/2022 | Beth Halachmi et al. |
| 2022/0159992 | A1 | 5/2022 | Hugenroth et al. |

FOREIGN PATENT DOCUMENTS

| | | | |
|---|---|---|---|
| EP | 0995685 B1 | 4/2003 | |
| EP | 1123010 B1 | 4/2003 | |
| EP | 1186240 B1 | 8/2005 | |
| EP | 1763478 A2 | 3/2007 | |
| EP | 2151168 B1 | 4/2015 | |
| EP | 2708141 B1 | 4/2018 | |
| EP | 3305090 B1 | 4/2020 | |
| EP | 3292768 B1 | 3/2021 | |
| GB | 2342957 A | 4/2000 | |
| GB | 2344139 A | 5/2000 | |
| GB | 2414225 A | 11/2005 | |
| WO | 2004103831 A3 | 12/2004 | |
| WO | 2005113387 A2 | 12/2005 | |
| WO | 2007121967 A3 | 2/2008 | |
| WO | 2014098547 A1 | 6/2014 | |
| WO | 2015011691 A1 | 1/2015 | |
| WO | 2022108696 A1 | 5/2022 | |
| WO | WO-2023177507 A1 * | 9/2023 | .............. A47J 43/06 |

* cited by examiner

500

250

504

502

FOOD PROCESSOR BLADE LOCK MECHANISM

CROSS REFERENCE TO RELATED APPLICATIONS

This application claims priority to and the benefit of U.S. Provisional Patent Application No. 63/601,580, filed on Nov. 21, 2023, and entitled "FOOD PROCESSOR BLADE LOCK MECHANISM", the contents of which are incorporated herein by reference as though fully set forth herein.

FIELD

The present disclosure relates to a food processing device and, more particularly, to a micro puree machine with a mechanism for locking a blade during use.

BACKGROUND

Domestic kitchen appliances (generally referred to herein as food processors) that are intended to make ice creams, gelatos, frozen yogurts, sorbets and the like are known in the art. Typically, a user adds a series of non-frozen ingredients to a mixing bowl, which often has been previously cooled, for example, in a freezer. The ingredients are then churned by a one or more paddles (sometimes referred to as dashers) while a refrigeration mechanism simultaneously freezes the ingredients. These devices have known shortcomings including, but not limited to, the amount of time and effort required by the user to complete the ice cream-making process. Machines of this nature are also impractical for preparing most non-dessert food products.

An alternative type of machine known for making a frozen food product may be referred to as a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree machines can also prepare non-dessert types of foods such as non-dessert purees and mousses.

SUMMARY

In at least one aspect, this disclosure describes a mechanism that automatically locks a rotating blade, coupling the blade to a processing shaft during processing and/or extrusion of the ingredients. In some implementations, this locking is achieved as an internal pin of the processing shaft moves along an axis prior to startup. The internal pin can include a plunger with sloped wings which engage ball bearings as the internal pin moves into the locked configuration. In some embodiments, the ball bearings are forced outwards, into cavities within a support hub of the blade. When the ball bearings are within the cavities, the blade can be locked to the processing shaft and can then be rotated by a motor to process ingredients in the processing bowl.

The ball bearings also sit within sockets of a coupling which connects the blade to a main shaft around the internal pin. In a home, or unlocked configuration, the blade is not locked to the processing shaft. In the unlocked configuration, the ball bearings are biased towards a central axis and rest within sockets within internal cavities within the coupling. In the unlocked configuration, the ball bearings do not extend far enough outward from the central axis to engage the cavities within the support hub of the blade. In this configuration, the blade can easily be removed by a user as needed for cleaning or replacement. Advantageously, this provides a reliable locking mechanism which allows the blade to be secured to the processing shaft during operation, and safely decoupled from the processing shaft and removed when not in operation.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1A:
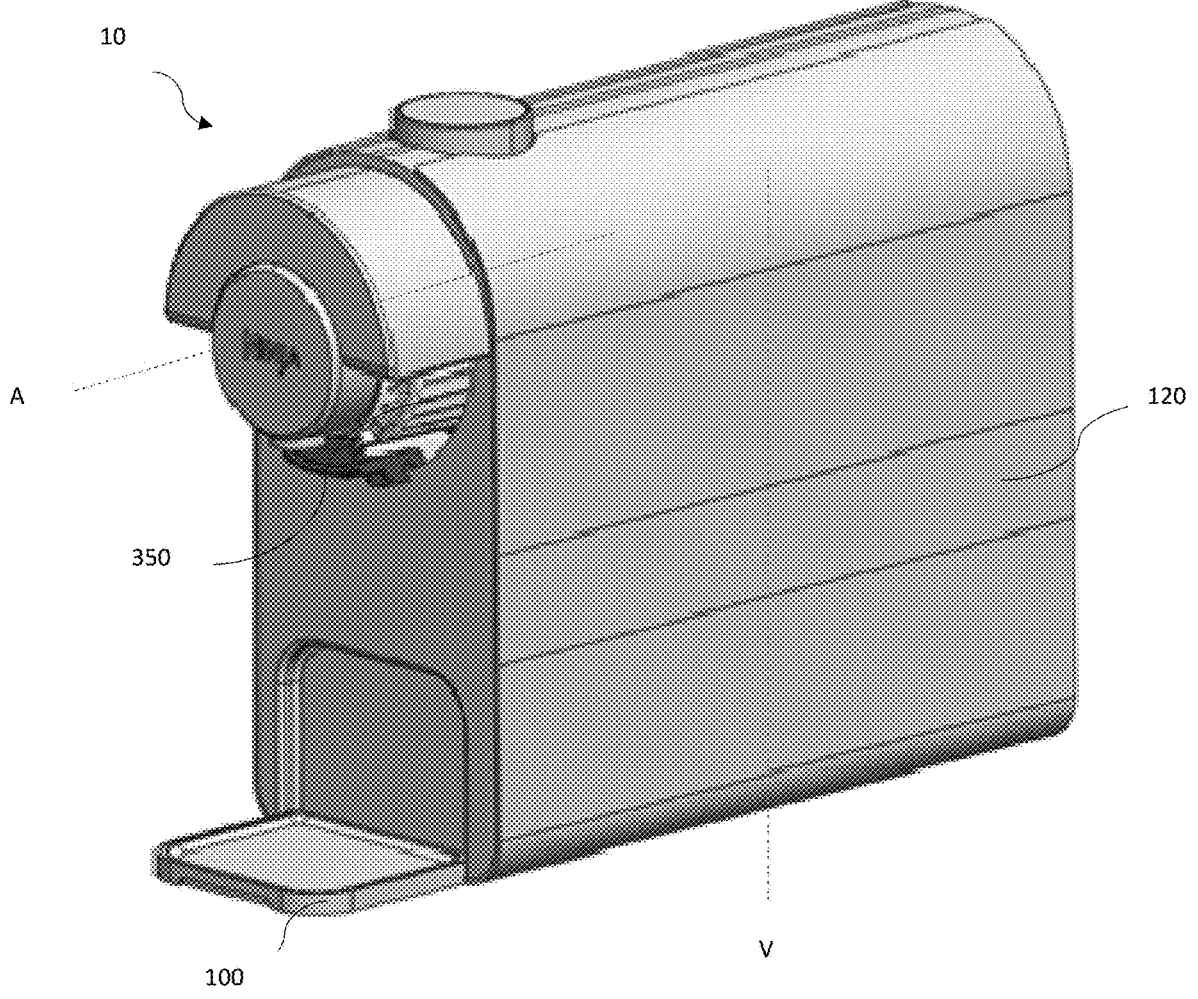
FIG. 1A shows an assembled view of a micro puree machine according to an illustrative embodiment of the disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

The mechanisms and techniques described herein may be used to configure a machine to process (e.g., micro-puree and aerate) and extrude ice cream and other frozen ingredients. It should be understood that while a micro puree machine 10 is given by way of example herein, the components of the micro puree machine 10 can be utilized in other food processing devices and/or kitchen appliances, at would be understood by one of skill in the art.

FIG. 1A shows an isometric view of a micro puree machine 10 according to an illustrative embodiment of the disclosure. The micro puree machine 10 may include a base 100 and a housing 120. The housing 120 may include a user interface (not shown) for receiving user inputs to control the micro puree machine 10 and/or display information. The micro puree machine 10 may also include a processing bowl 350, as further described below. The processing bowl 350 may contain one or more ingredients for processing. The processing bowl 350 may be assembled to the housing 120 such that a central axis A of the processing bowl 350 extends perpendicular to a vertical axis V of the housing 120, as shown. However, the disclosure contemplates that the processing bowl 350 may be assembled to the housing 120 such that the central axis A extends at an angle of between 0 and 90° to the vertical axis V, or such that the central axis A extends parallel to the vertical axis V. In embodiments, the processing bowl 350 can be manufactured from a disposable material to enhance the convenience of using the micro puree machine 10. Further, the processing bowl 350 can be sold as a stand-alone item and can also be prefilled with ingredients to be processed during use of the micro puree machine 10.

Figure 1B:
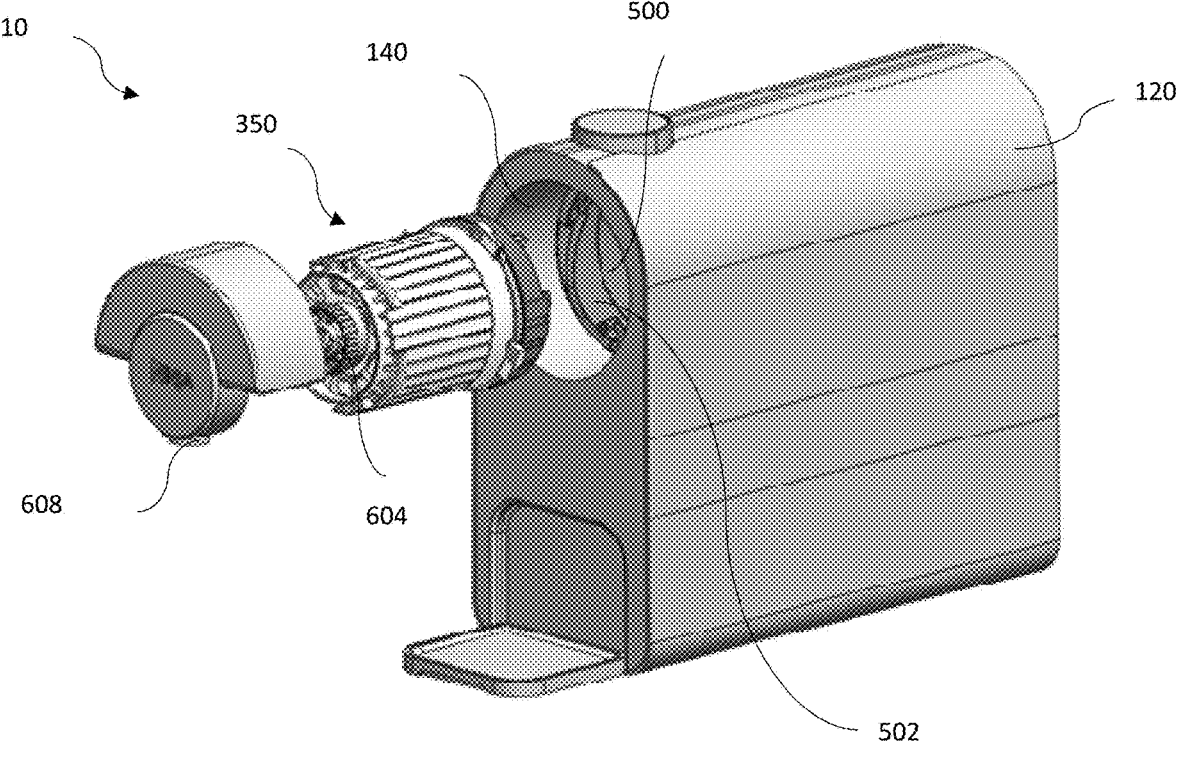
FIG. 1B shows the micro puree machine FIG. 1A in a disassembled view according to some embodiments of the disclosure.

FIG. 1B shows the micro puree machine 10 of FIG. 1A with the processing bowl 350 disassembled from the housing 120 according to some embodiments. As shown in FIG. 1B, the housing 120 may including a coupling 500 disposed within an opening 140 of the housing 120. An inner surface 502 of the coupling 500 may comprise locating and locking elements for positioning and connecting the processing bowl 350 to the coupling 500, as further described below. The processing bowl 350 may include an opening 604 alignable with a nozzle 608 for extruding processed ingredients from the processing bowl 350. The nozzle 608 may be arranged such that the ingredients are extruded in a vertically downward direction. The disclosure also contemplates that multiple nozzle shapes may be provided to allow for user customizability. For example, multiple nozzles may be included on a rotatable dial that allows the user to select the desired nozzle shape. In further embodiments, the extrude function may be integrated into a program on the user interface with a predetermined translation speed/flow rate.

Figure 2:
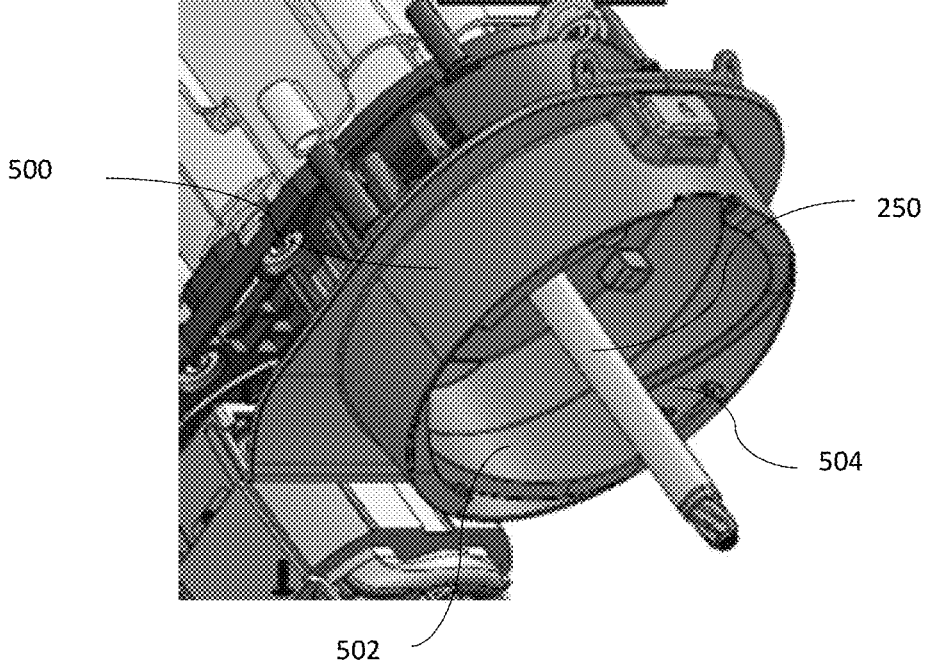
FIG. 2 is a detailed view of the coupling and the processing shaft of the micro puree machine according to some embodiments of the disclosure.

FIG. 2 is a detailed view of the coupling 500 and the processing shaft 250 of the micro puree machine 10 according to some embodiments. As shown in FIG. 2, the processing shaft 250 may extend through the coupling 500 to couple with either a blade or a plunger housed within a lid on the processing bowl 350. The inner surface 502 of the coupling 500 may comprise one or more helical slots 504 sized to receive at least one corresponding helical projection 352 (FIG. 3A) on an outer surface of the processing bowl 350. In embodiments, the at least one helical slot 504 may be four helical slots 504 spaced 90 degrees apart about the inner surface 502 of the coupling 500 for receiving a corresponding one of four helical projections 352 on the processing bowl 350. However, the disclosure contemplates more or fewer than four helical slots 504.

Figure 3A:
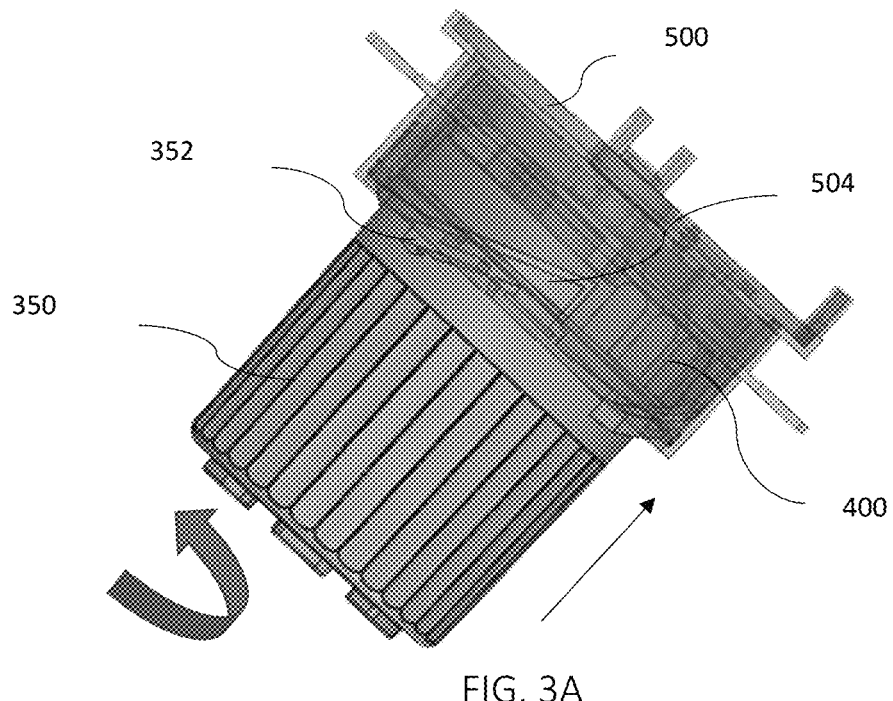
FIGS. 3A and 3B illustrate rotation of the bowl into the coupling of the micro puree machine, according to some embodiments.
Figure 3B:
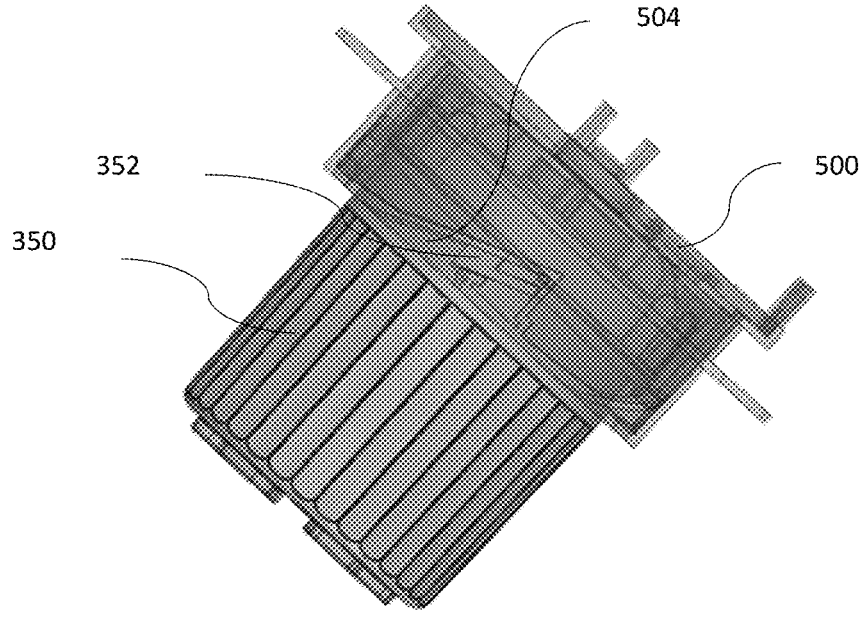

FIG. 3A shows the processing bowl 350 inserted into the coupling 500 (shown in a transparent view for ease of illustration) but before the processing bowl 350 is secured to the coupling 500 according to some embodiments. As shown in FIG. 3A, the user may rotate the processing bowl 350 relative to the coupling 500 in a first direction (e.g., clockwise) such that the protrusions 352 rotate into the slots 504, securing the processing bowl 350 to the coupling 500 (FIG. 3B). Because of the angle of the slots 504 and the protrusions 352, rotating the processing bowl 350 relative to the coupling 500 may cause the processing bowl 350 to move both rotationally and axially within the coupling 500.

Figure 4A:
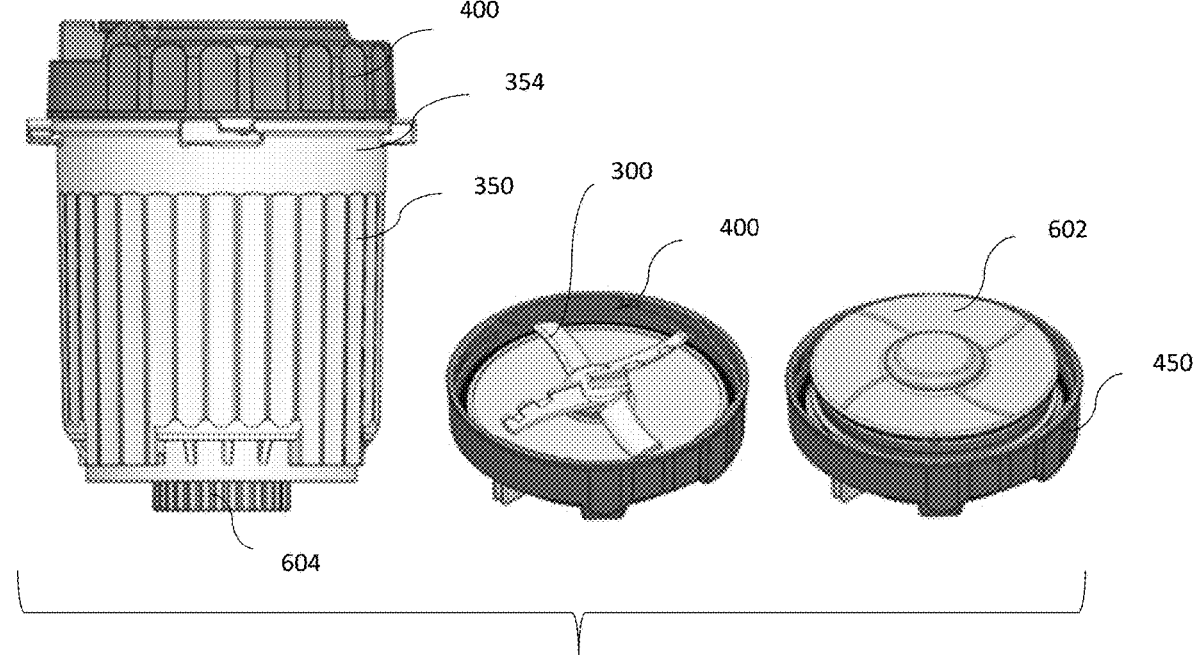
FIGS. 4A-4D illustrate the use of the blade and extrusion assemblies according to some embodiments of the disclosure.
Figure 4B:
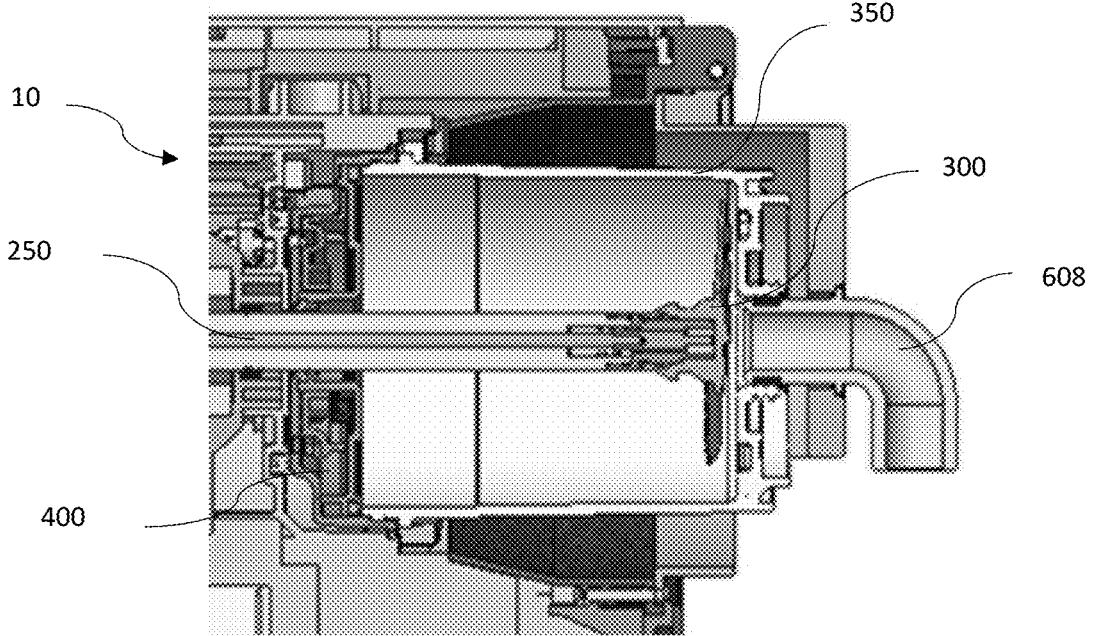
Figure 4C:
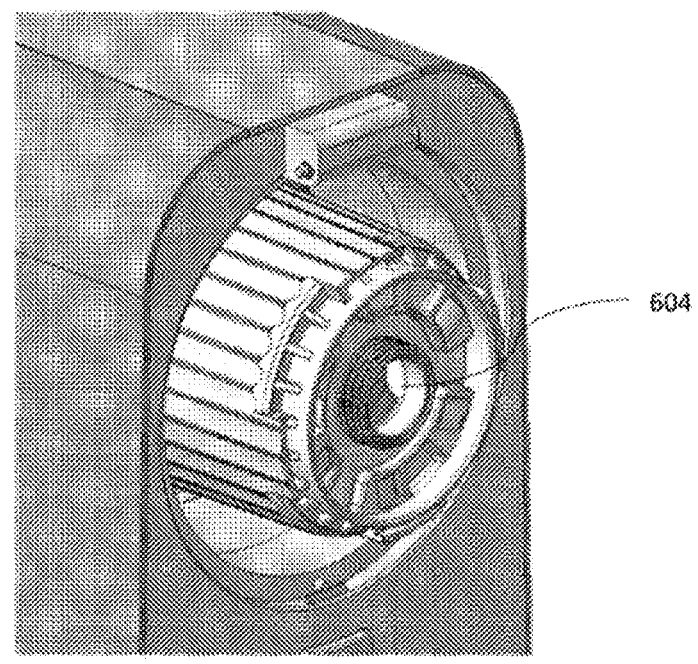
Figure 4D:
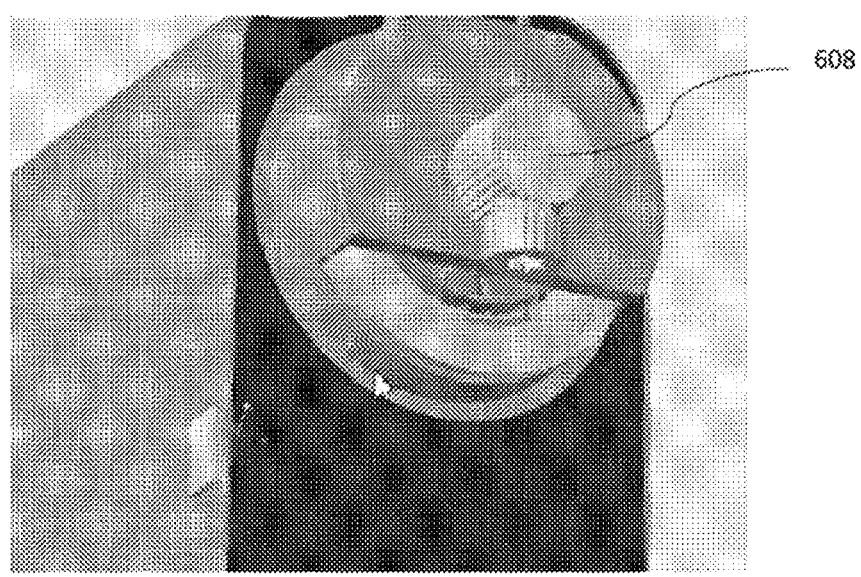

FIGS. 4A-4D illustrate the use of the blade 300 and the plunger 602 according to some embodiments of the disclosure. As shown in FIG. 4A, an open end 354 of the processing bowl 350 may be configured (e.g., with threading for screwing or features for bayoneting) to couple to both a first lid 400 housing the blade 300 and a second lid 450 housing the plunger 602. As shown in FIG. 4B, the user may attach the first lid 400 to the processing bowl 350 and couple to the processing bowl 350 to the micro puree machine 10. The processing shaft 250 may couple to the blade 300 to descend the blade 300 within the processing bowl 350 to process the ingredients, for example, as described in more detail elsewhere herein. After processing (e.g., creamifying) the ingredients, the user may remove the processing bowl 350 from the micro puree machine 10 and remove the first lid 400. The user may then attach the second lid 450 to the processing bowl 350 and couple the processing bowl 350 to the micro puree machine 10. The processing shaft 250 may couple to the plunger 602 to descend the plunger 602 through the processed ingredients. This in turn may cause the processed ingredients to be extruded through the opening 604 (FIG. 4C) and through the nozzle 608 (FIG. 4D). In some embodiments, rather than extruding through an opening (e.g., 604) on the bottom wall of the processing bowl 350, ingredients may be extruded through a sidewall (e.g., cylindrical sidewall) of the processing bowl 350 near the bottom wall.

Figure 5A:
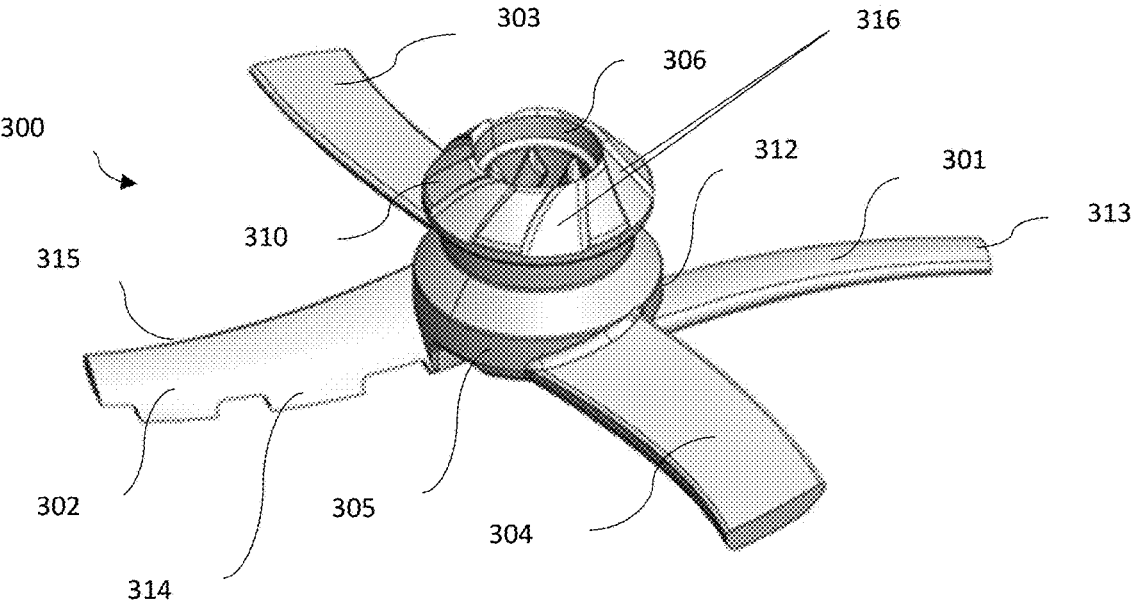
FIGS. 5A-F show various configurations of the blade assembly of this disclosure with serrated grooves according to some embodiments.

FIG. 5A shows an isometric view of an embodiment of the blade 300 of this disclosure. Embodiments of the blade 300 can comprise a unitary structure or distinct structures joined together either directly or indirectly. In embodiments, the material of the blade 300 may comprise cast stainless steel with a PVD titanium coating. The blade 300 may comprise one or more cutting arms 301, 302 (for example, two as shown) and one or more mixing arms 303, 304 (for example, two as shown). The blade 300 may further comprise a central support hub 305. The cutting arms 301, 302 and the mixing arms 303, 304 extend outward from the central support hub 305. The central support hub 305 may define a central opening 306 for accepting the processing shaft 250 (FIG. 2). The cutting arms 301 and 302 may comprise a horizontally extending length having a proximal end 312 and a distal end 313. The proximal end 312 meets the central support hub 305. The cutting arms 301, 302 may also comprise a leading edge 314 and a following edge 315. Likewise, mixing arms 303, 304 extend from the central support hub 305 and are generally positioned in an opposing orientation. In embodiments, the cutting arms 301, 302 and the mixing arms 303, 304 may have a curvature extending along all or at least a portion of the length of the arms 301, 302, 303, 304 in a concave configuration in relation to a direction of rotation during use.

Still referring to FIG. 5A, embodiments of the central support hub 305 may also comprise an angled external ledge 310. The ledge 310 may include a plurality of features for clearing slush deposits when the blade 300 is engaged with the lid 400. For example, a top surface of the ledge 310 may define a series of serrated grooves 316 alternating in depth around the circumference of the ledge 310. As the blade 300 retracts into the lid 400, the serrated grooves increase the contact area between the blade 300 and the ice, allowing more ice to be sloughed off the blade 300.

Figure 5B:
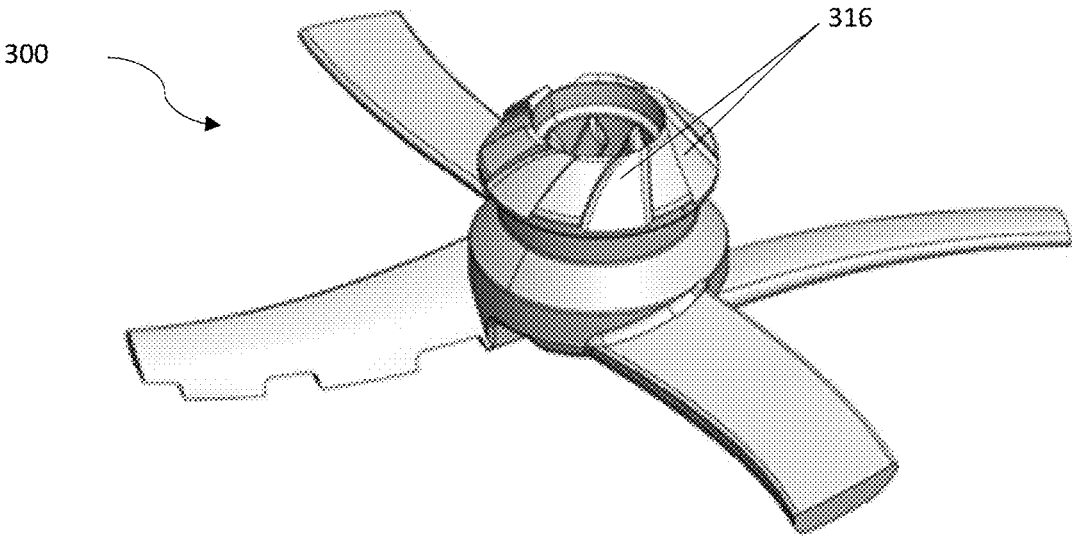
Figure 5C:
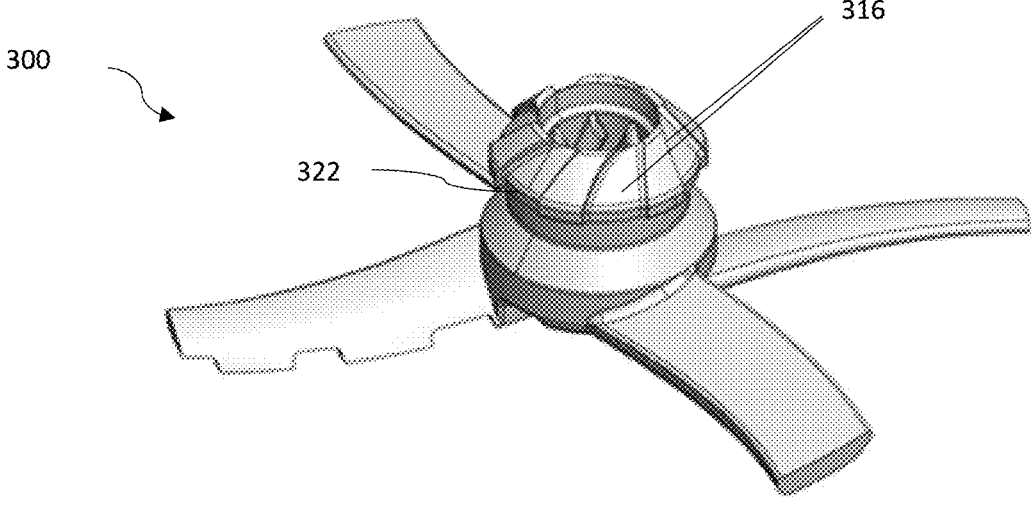
Figure 5D:
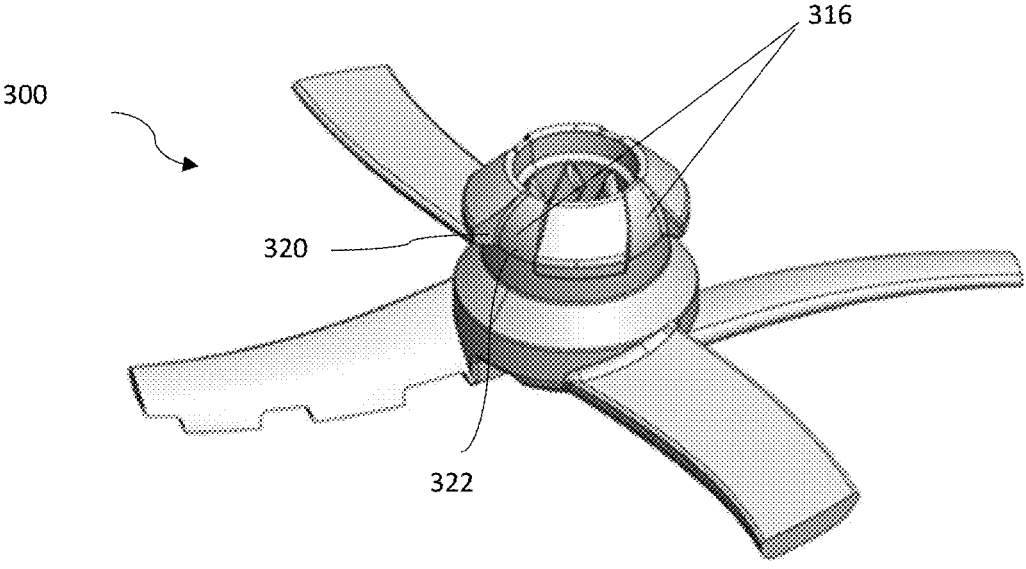
Figure 5E:
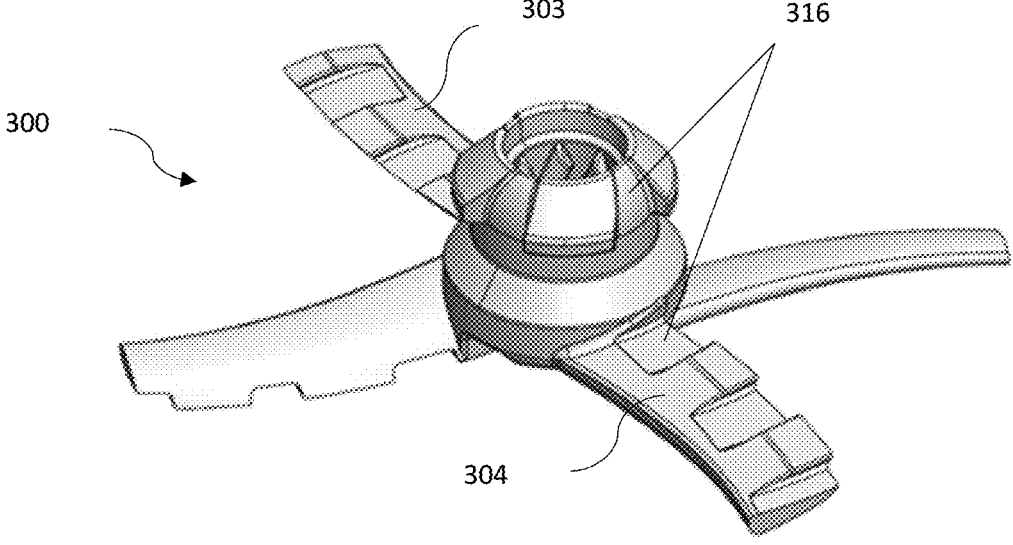
Figure 5F:
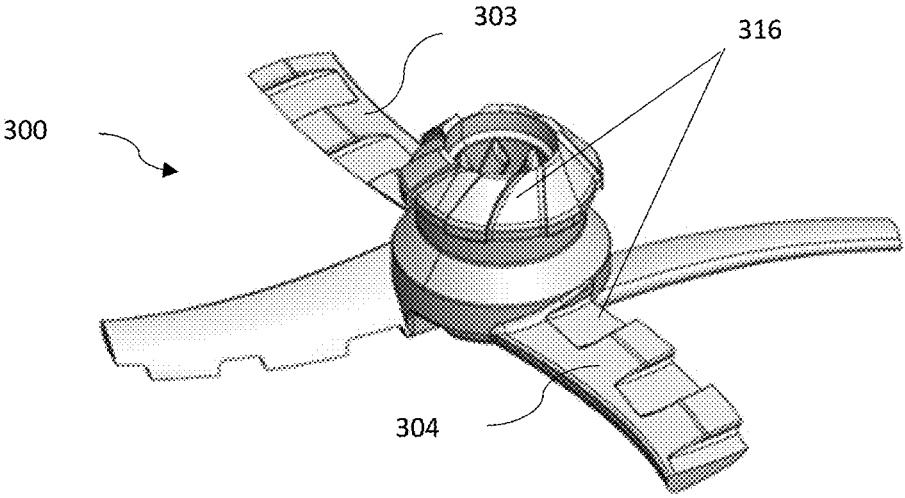

Various configurations of the serrated grooves 316 are shown in FIGS. 5B-D. As in FIG. 5A, the ledge 310 in FIGS. 5B-D includes the plurality of serrated grooves 316. For example, in FIG. 5B, the serrated grooves 316 have an increased depth to improve the cutting action as the blade 300 retracts through the slush. In FIG. 5C, an outer diameter of an overhang 322 of the serrated grooves 316 is reduced with respect to the remainder of the ledge 310 to improve the cutting action and to free up space around the blade 300 for ice to fall away. In FIG. 5D, the outer diameter of the overhang 322 of the serrated grooves 316 is reduced even further to allow for ice to fall, and to increase the size of the cutting teeth 320. In other embodiments, shown in FIGS. 5E and 5F, both the ledge 310 and the mixing arms 303, 304 include the serrated grooves 316 for increased moving of ice away from the blade 300.

FIGS. 6A-9C are cross-sectional views of components of a locking mechanism 800 for a food processor (e.g. micro puree machine 10) particularly focused on the processing shaft 250. As will be discussed in more detail below, FIGS. 6A-9A illustrate movement of the components between an unlocked startup configuration (show in FIGS. 6A-7C) and a locked configuration for operation (FIGS. 8A-9C). It should be understood that the configurations described herein refer to the arrangement of certain components with respect to the other components of the machine 10.

The processing shaft 250 includes an internal pin 260 which is moveable within, and guided by, a main shaft 262 to move axially. For example, when the micro puree machine 10 is oriented as shown in FIGS. 1A-1B, the main shaft 262 can direct the internal pin 260 to move horizontally, along the central axis x. In other embodiments, the main shaft 262 can be oriented such that the central axis x is oriented in another direction, such as vertically. A handle 736 of the internal pin 260 extends out from the main shaft 262, providing a grip for a user to move the internal pin 260. The main shaft 262 is joined to a first end 701 of a coupling 710, for example via interlocking threads opposing the direction of rotation of the blade 300'. The blade 300' is positioned around the coupling 710, for example, further down the coupling 710 from the first end 701 at which the main shaft 262 joins the coupling 710. To that end, the blade 300' can include a support hub 305' with a central opening which receives the coupling 710. In this position, the support hub 305' sits around the exterior of the coupling 710.

In some embodiments, blade 300' is similar, but not the same as, blade 300 illustrated in FIGS. 5A-5F. Unlike the blade 300, blade 300' does not include helical coupling members within its central opening, like those shown in opening 306. This is because blade 300 may be helically coupled to the helical threads of a drive shaft of a micro-puree machine. However, the locking mechanism 800, including the coupling 710, are configured for linear coupling to a blade or other component, instead of helical coupling. As such, helical coupling members are not necessary or desirable, and in fact could impede coupling blade 301' to the coupling 710. Rather, an internal wall of the opening in blade hub 305' may have internal cavities for receiving ball bearings of the locking mechanism 800, as is described in more detail elsewhere herein. Likewise, the support hub 305' can be similar to the support hub 305, except as otherwise shown and described herein.

Figure 6A:
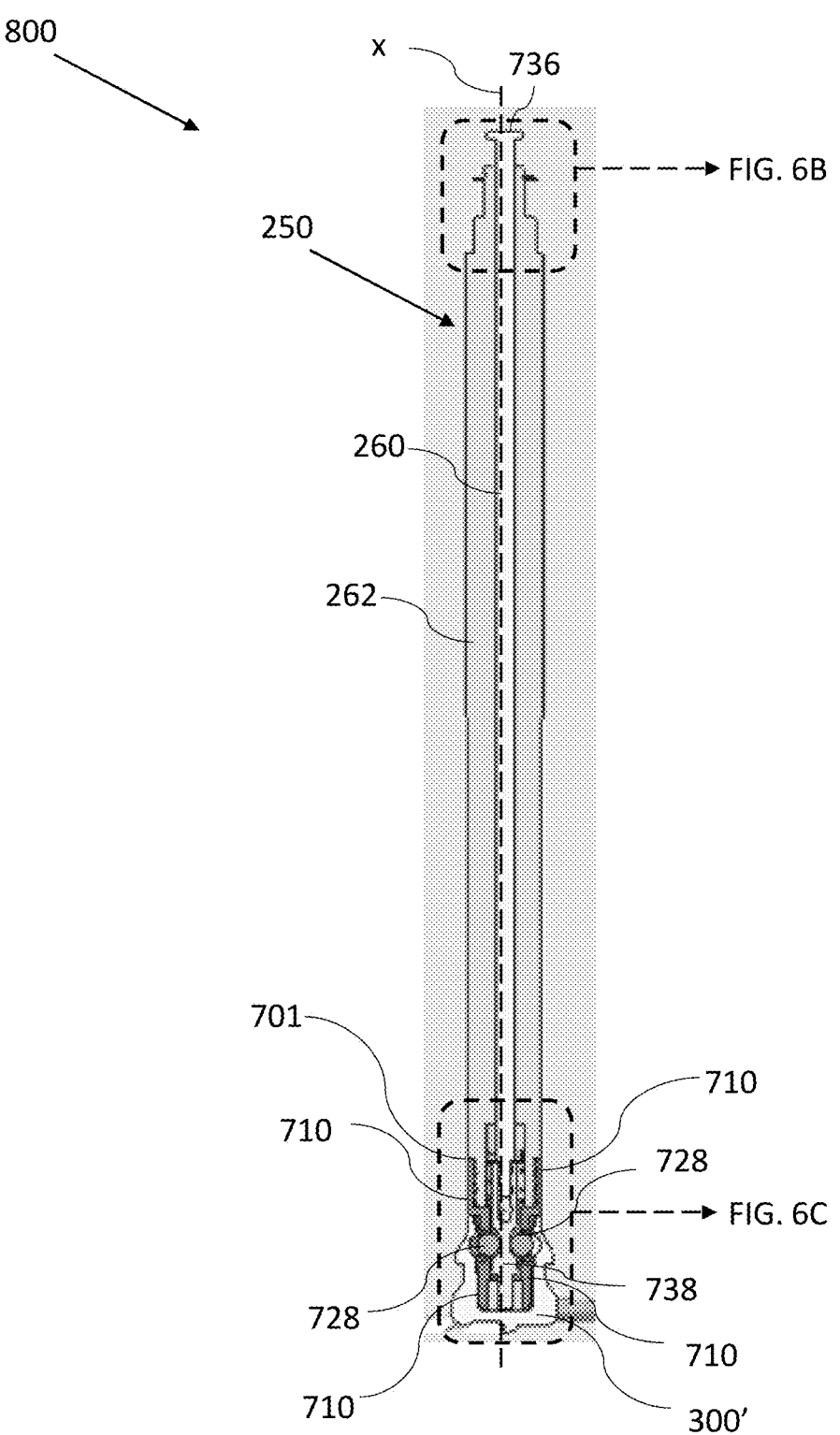
FIGS. 6A-6C show cross sectional views of a locking mechanism and related components in an unlocked configuration in accordance with this disclosure.

Near the coupling 710, the main shaft 262 defines an inner chamber 720 of a greater width than the internal pin 260. An extension member 722 is coupled to move in conjunction with the internal pin 260 (either by attachment to the internal pin, or by attachment to a plunger 738 discussed in more detail below). The extension member 722 extends outwardly from the internal pin 260 and moves within the chamber 720 as the internal pin 260 moves. A spring 724 sits within the chamber 720, surrounding the internal pin 260, and engages the extension member 722. As the internal pin 260 moves towards the blade 300', (i.e., vertically downward as shown in FIG. 6A), the extension member 722 compresses the spring 724. This creates a biasing force against the internal pin 260, pressing the internal pin 260 away from the blade 300' along the central x axis.

The coupling 710 forms internal sockets 726 within which ball bearings 728 are contained. The ball bearings 728 can be a rigid material, such as stainless steel or the like. The sockets 726 are sized and shaped to retain the ball bearings 728 within the coupling 710. As will be discussed in more detail below, in the locked configuration, the ball bearings 728 secure the blade 300' to the processing shaft 250. In the unlocked configuration, the ball bearings 728 are not locked and therefore can be moved into an internal chamber 744 defined by the coupling 710 and rest within the internal chamber 744 and sockets 726. The ball bearings 728 are not locked to the blade 300' in this position, and therefore the blade 300' can be removed, for example, relatively easily with small force. The coupling 710 can also include ball coverings 732 which surround the ball bearings 728 and are sized and shaped to conform to the ball bearings 728 and retain them within the coupling 710. This prevents the ball bearings 728 from falling out of the coupling 710. The coupling 710 includes one or more magnets 730 near the location at which the blade 300' comes into contact with the coupling 710, which magnets 730 apply a magnetic force to attract the blade 300'. In the unlocked configuration, the magnets 730 removably couple the blade 300' to the coupling 710 to hold the blade in place. However, the magnets 730 may be configured such that that the magnetic force between the magnets 730 and the blade 300' is relatively small, for example, just enough to overcome gravity and other static forces to keep the blade in place, e.g., until the blade 300' is locked to the main shaft 262. For example, if the blade 300' was disengaged from the lid 400 of the bowl 350, a user could readily remove the blade 300' by simply pulling the blade 300' and overcoming the magnetic force. This allows for the blade 300' to be easily detached for cleaning or replacement while in the unlocked configuration.

Referring to FIGS. 6A-7C, the components are shown in the unlocked, or startup configuration, in which the internal pin 260 can connect to part of the housing 734 of the micro puree machine 10. This generates a force pushing down on the handle 736 of internal pin 260, that secures the internal pin 260 in the unlocked position before startup. When startup begins, the internal pin 260 can be disengaged to allow movement. In the startup configuration, the spring 724 is compressed. Therefore when the internal pin 260 is disengaged, force from the spring 724 pushes the internal pin 260 away from the blade 300' (i.e. vertically upward as shown in FIGS. 6A-7C).

Figures 6B, 6C:
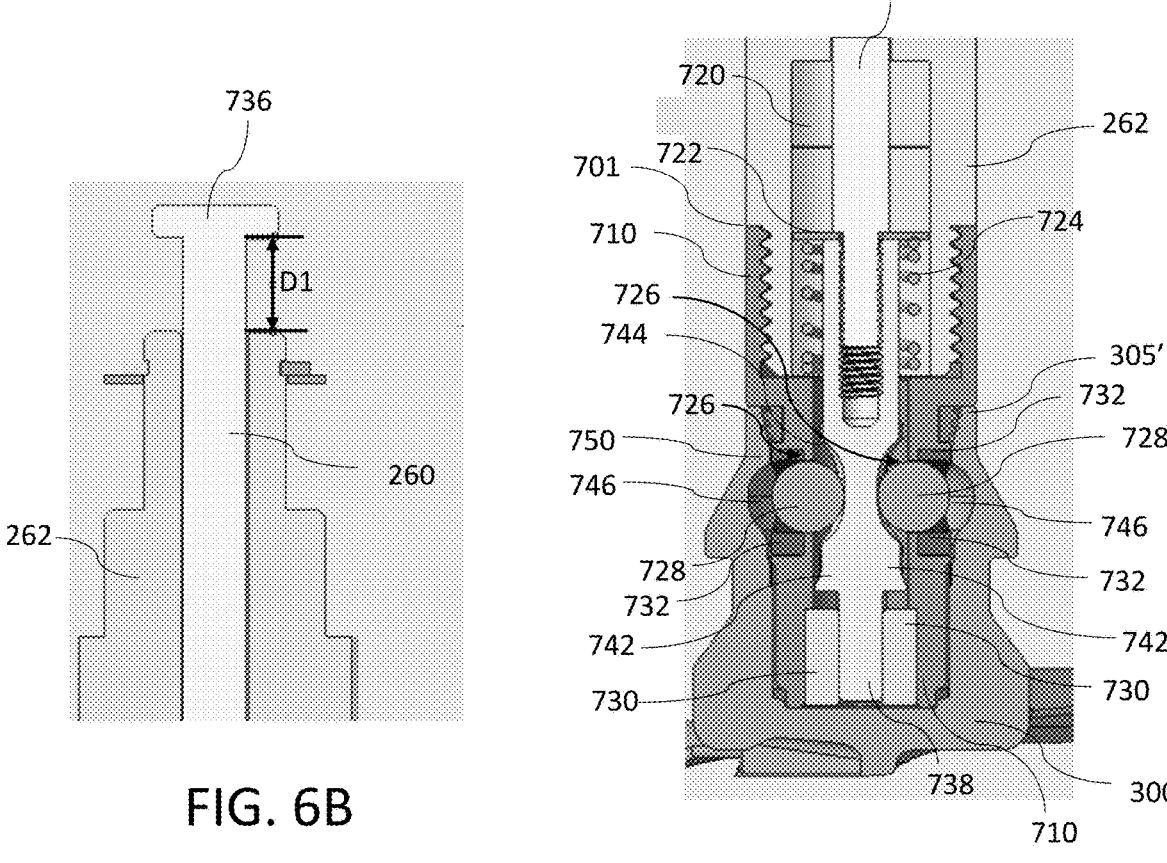

As best seen in FIG. 6C, the end of the internal pin 260 nearest the blade 300' includes a plunger 738. The plunger 738 can be removably attached to the internal pin 260 via threads (as shown) or by other known mechanisms for removably coupling two parts. Alternatively, the plunger 738 and the internal pin 260 can be permanently coupled or formed as a unitary body. The plunger 738 forms wings 742, which define a sloped surface increasing in width towards the end of the plunger 738 closest the blade 300'. These wings 742 contact the ball bearings 728 as the internal pin 260 and plunger 738 move away (upwardly in the context of FIGS. 6A-9C) from the blade 300', moving from the unlocked configuration of FIGS. 6A-7C to the locked configuration of FIGS. 8A-9C). During movement between these two configurations, the sloped surfaces of the wings 742 force the ball bearings 728 further outward, into internal cavities 746 of the blade 300'. This allows the blade 300' to be locked to the processing shaft 250, as discussed in more detail below. Notably, while wings 742 are referred to plurally herein, it should be understood that both wings 742 can be formed by a single unitary member extending around the entire circumference of the plunger 738.

Figure 7A:
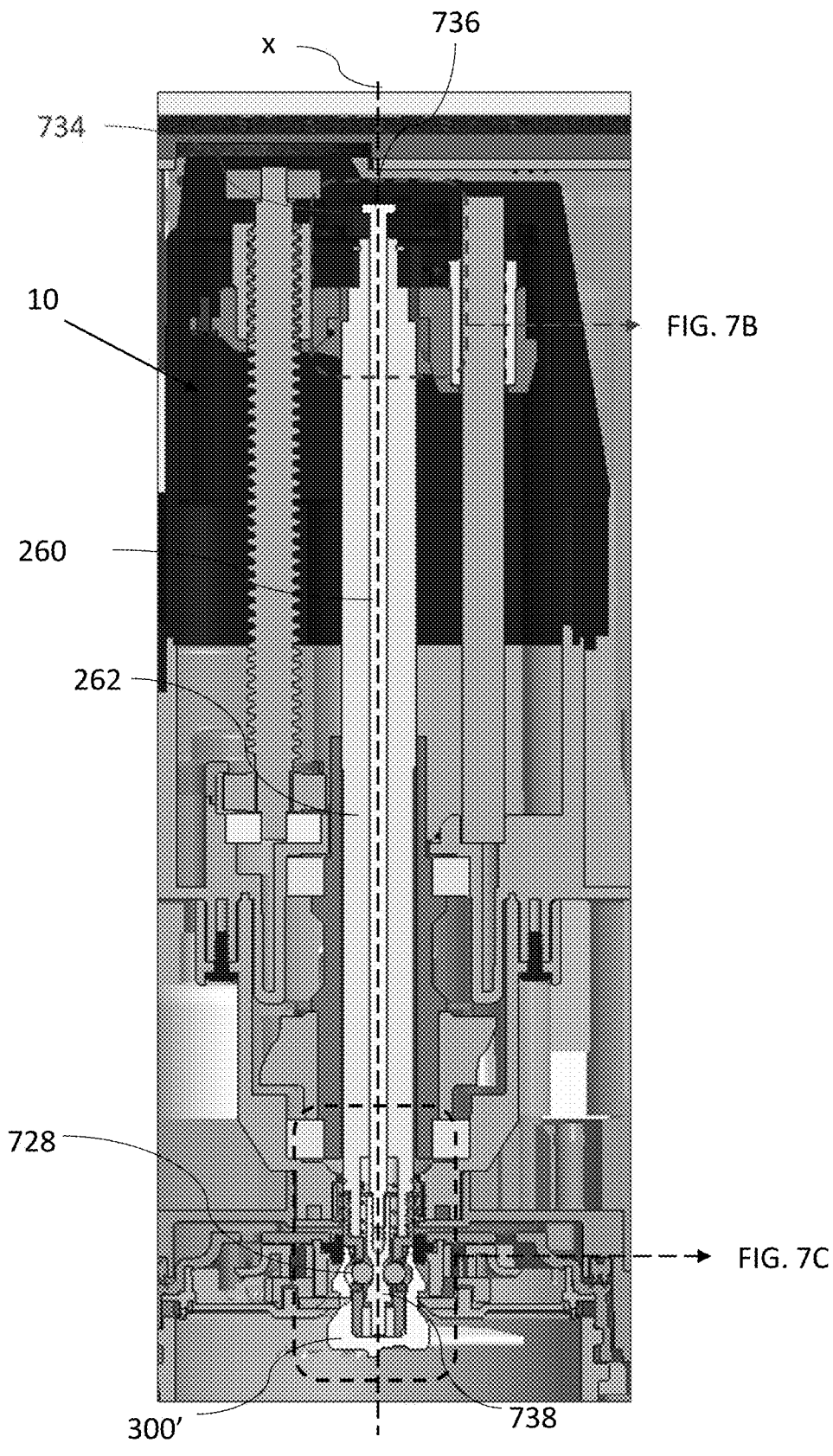
FIGS. 7A-7C are similar cross sections views to FIGS. 6A-6C, but also show surrounding components of the micro puree machine in accordance with this disclosure.
Figures 7B, 7C:
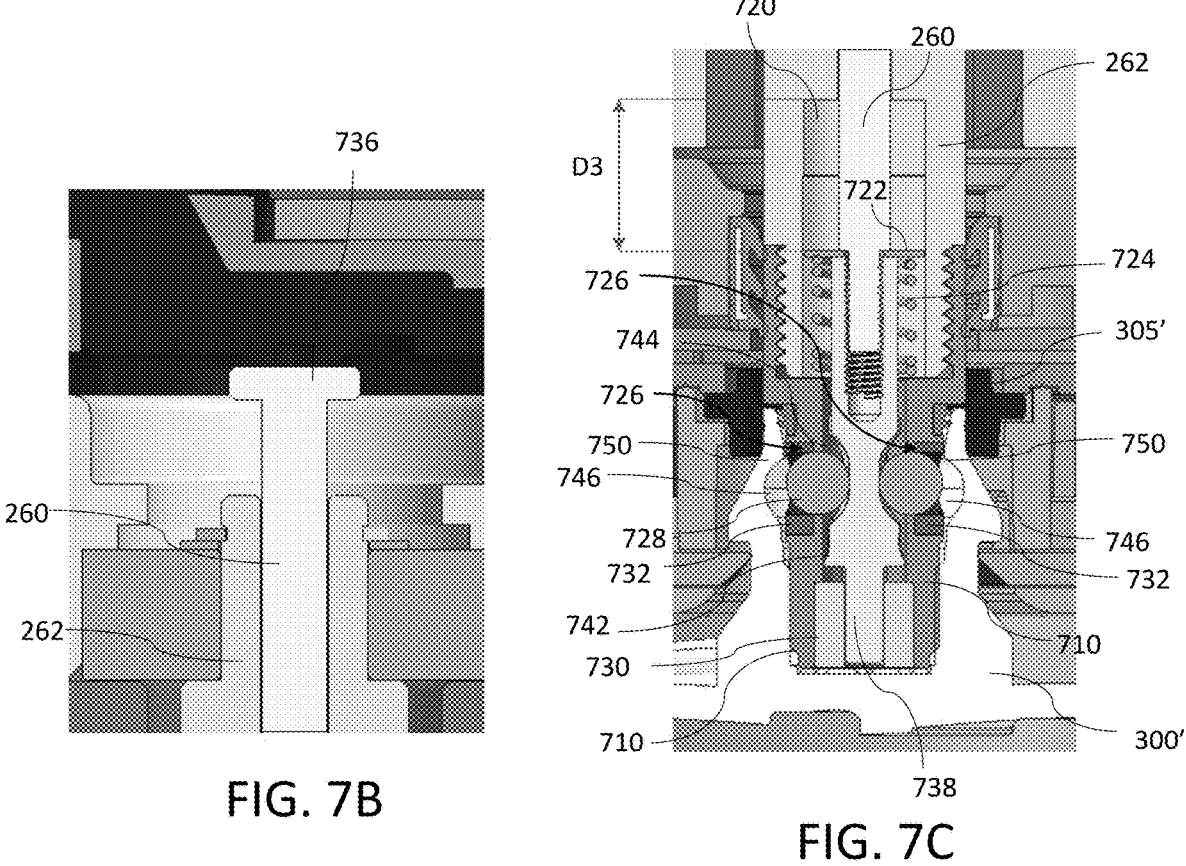
Figure 8A:
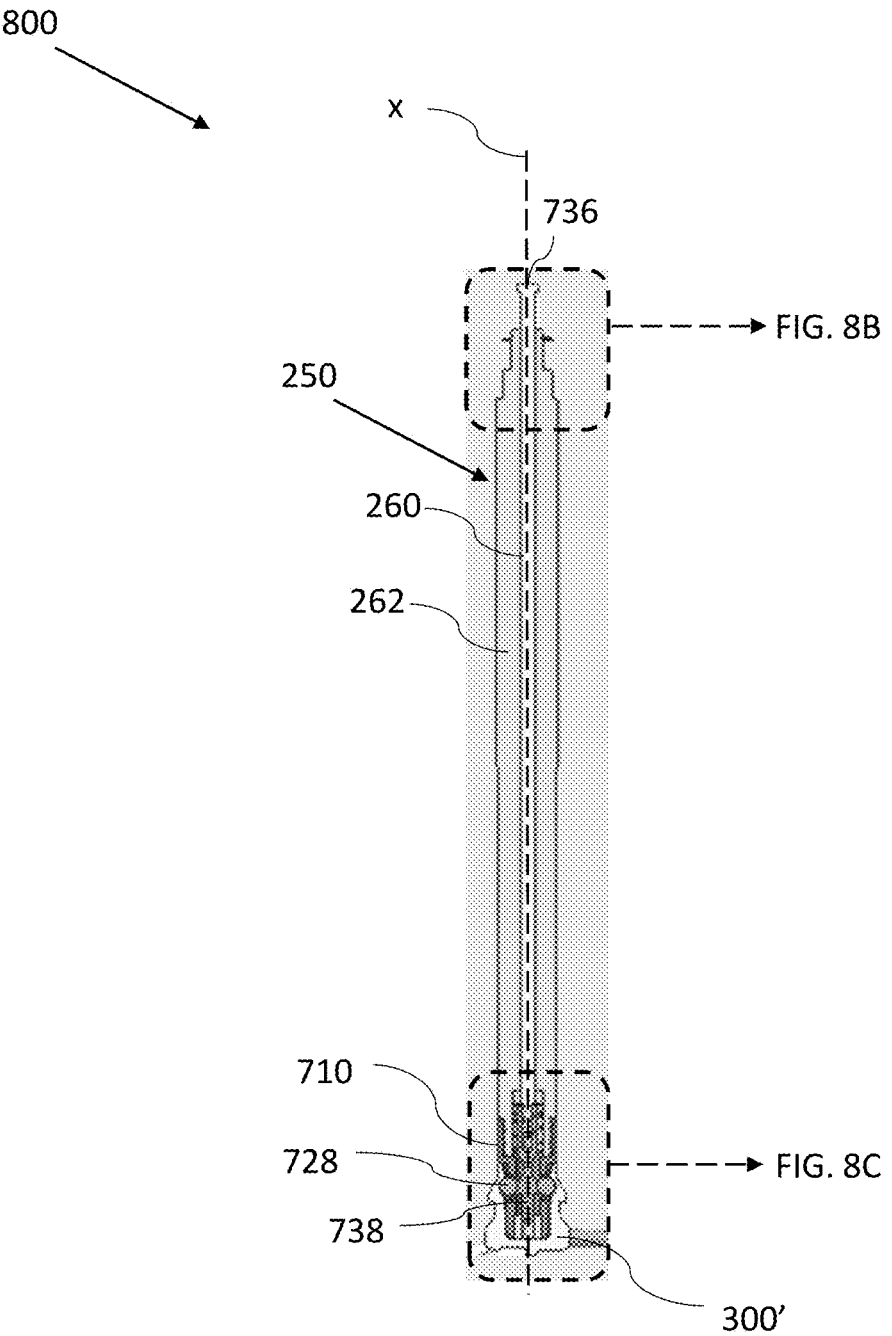
FIG. 8A-8C show cross sectional views of a locking mechanism and related components in a locked configuration in accordance with this disclosure.
Figures 8B, 8C:
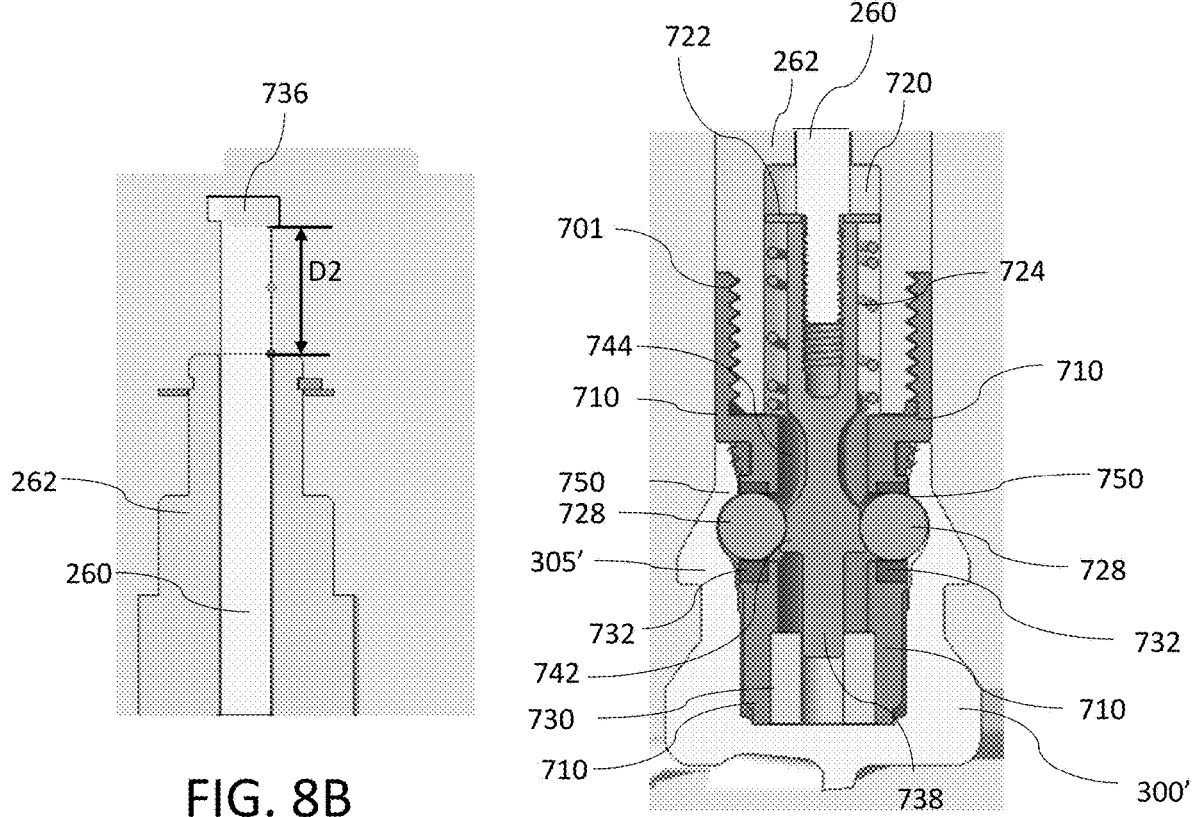
Figure 9A:
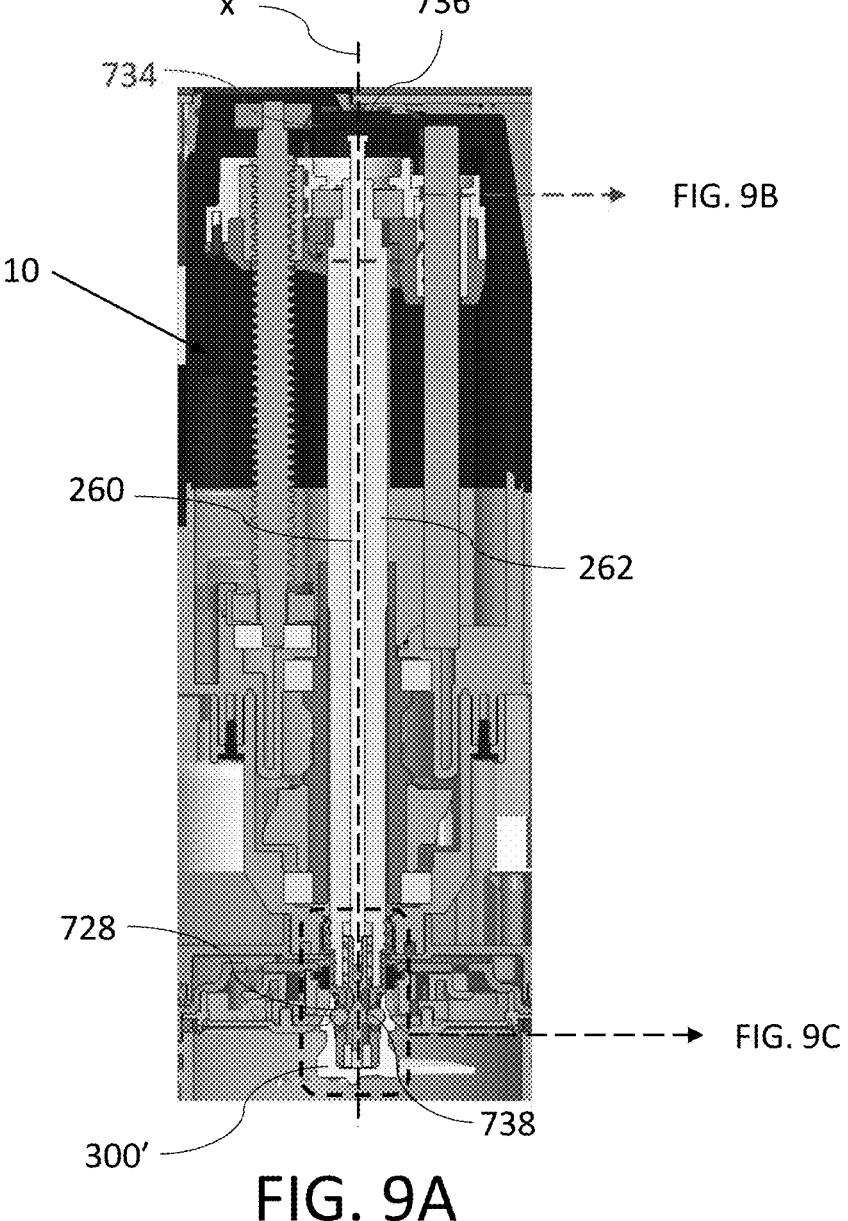
FIGS. 9A-9C are similar cross sections views to FIGS. 8A-8C, but also show surrounding components of the micro puree machine in accordance with this disclosure.
Figure 9B:
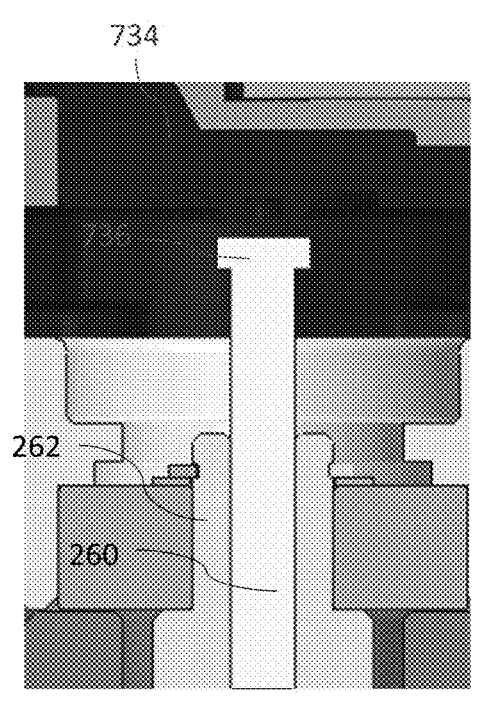
Figure 9C:
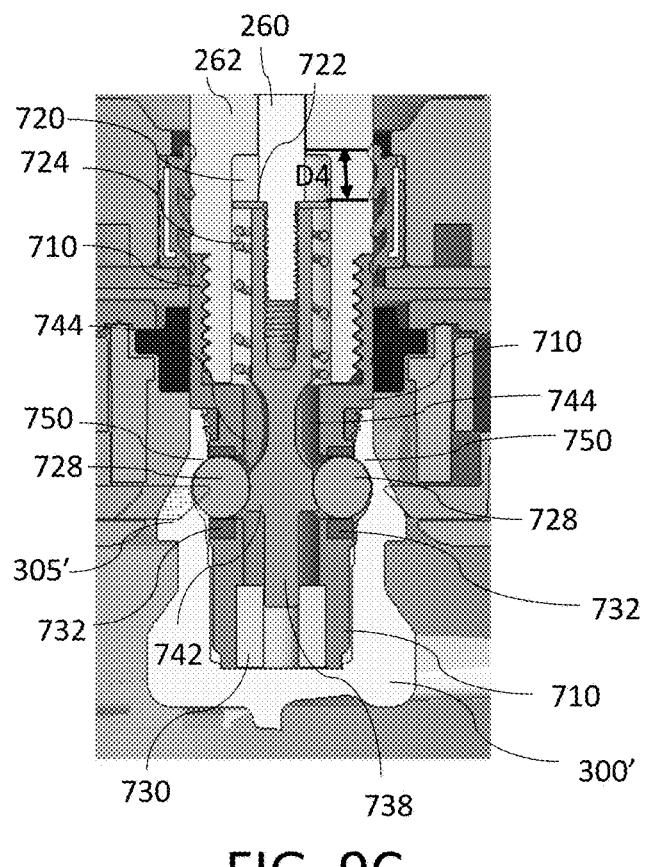

Movement between the unlocked and locked configurations can be visualized by comparing FIG. 6B (unlocked) to FIG. 8B (locked) and comparing FIG. 7C (unlocked) to FIG. 9C (locked). As shown in FIG. 6B, in the unlocked configuration the handle 736 of the internal pin 260 is located a distance D1 from the top of the main shaft 262. By contrast, in the locked configuration of FIG. 8B, the handle 736 is located a distance D2 from the top of the main shaft 262. In some embodiments, D1 can be equal to or about 5.9 mm, while D2 can be equal to or about 10.5 mm. In such a case, the internal pin 260 moves away from the blade 300' along the central axis x a distance equal to or about 4.6 mm between the unlocked configuration and the locked configuration. Similarly, FIG. 7C shows a distance D3 between the extension member 722 and the end of the internal chamber 720 in an unlocked configuration, while FIG. 9C shows a distance D4 between the extension member 722 and the end of the internal chamber 720 in a locked configuration. In one example, D3 can be equal to or about 8.4 mm while D4 can be equal to or about 3.8 mm. This would likewise mean the internal pin 260 moved equal to or about 4.6 mm between the unlocked and locked configuration. It should be understood that these distances are exemplary only and provided to explain one possible embodiment that has been found to be effective. Other separation distances may also be effective.

Referring now to FIGS. 8A-9C, the locked configuration is shown. In this position, the wings 742 bias the ball bearings 728 against the sidewalls of the internal cavities 746 of the blade 300'. The wings 742 can have an external surface with a slight concave shape, to mirror a convex (i.e., circular) shape of the ball bearings 728 and help hold them in place. Similarly, the internal cavities 746 can have a concave shape to match the convex shape of the ball bearings 728. A narrow lip 750 near the end of the blade's support hub 305' further secures the blade 300' to the ball bearings 728 by narrowing a diameter between the internal sidewalls of the blade 300'. In the locked configuration, the ball bearings 728 are pressed outward to form a width that is greater than the diameter between the lips 750, preventing the blade 300' from being removed. Since the ball bearings 728 are also fixed within sockets 726 of the coupling 710, and the coupling 710 is connected to the internal pin 260, this arrangement effectively locks the processing shaft 250 to the blade 300'.

In this way, the processing shaft 250 can be reliably locked to the blade 300', during operation, holding the blade 300' in place. The blade 300' can then be driven by the processing shaft 250 to create rotational movement of the blade 300', and can also be driven downwards (in the orientation shown) by the micro puree machine 10 at the same time for processing food. The food processing is accomplished by both the rotational movement of the blade 300' and the downward movement of the blade. When food processing is complete, the blade 300' may be moved upwards to its startup, or unlock configuration. The handle 736 can then be pressed back in the direction of the blade 300' along the central axis x to reach the unlocked configuration shown in FIGS. 6A-7C. In the unlocked configuration, the blade 300' is then only held in position by the force from the magnets 730, and therefore can be easily removed, for example, while still coupled to lid 400.

Figure 10A:
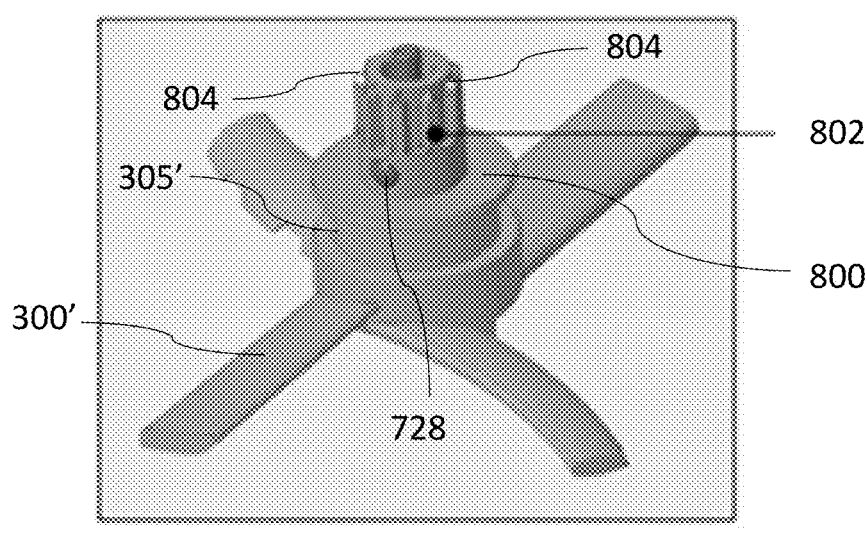
FIGS. 10A-B show an alternate embodiment of a locking mechanism in accordance with this disclosure.
Figure 10B:
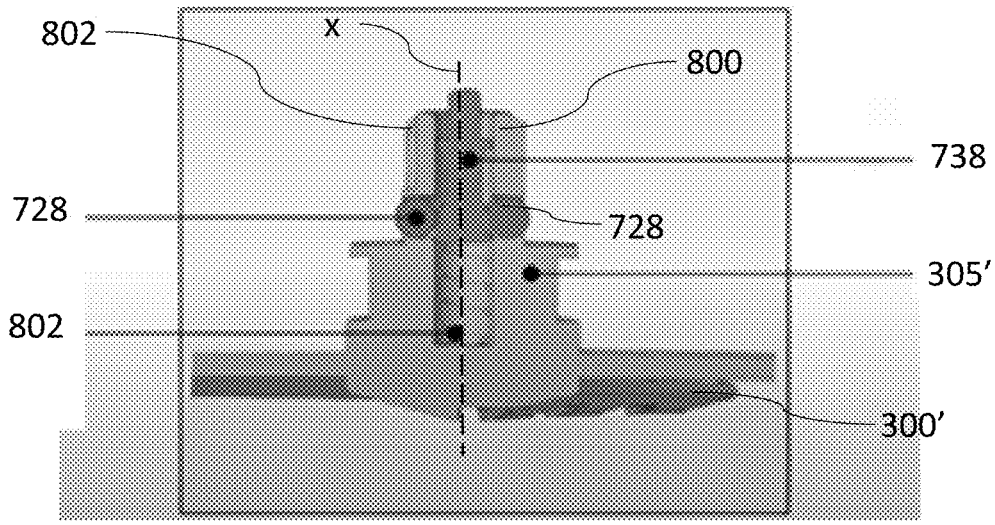

Referring now to FIGS. 10A-10B, an embodiment is shown of the micro puree machine with a different coupling arrangement. In this embodiment, the coupling 710 has been replaced by the coupling 800. However, except where differences are shown or described herein, it should be understood that the coupling 800 serves the same function as the coupling 710.

In particular, the coupling 800 uses threads 802 which run parallel to the central axis x of the processing shaft 250 (i.e. vertically as shown in FIGS. 10A-B). The main shaft 262 can then include similar teeth running parallel to the axis x. The tops of the teeth 804 can be pointed to facilitate easy engagement between the teeth of the main shaft 262 and coupling 800 as they are initially attached. After the teeth 804 of the coupling are engaged with teeth of the main shaft 262, rotational movement through the processing shaft 250 will turn the coupling 800, thereby turning the blade 300' for processing any ingredients in the bowl 350.

Further, the spring 724 can be replaced or supplemented by the spring 802. The spring 802 sits below plunger 738, in between the plunger 738 and blade 300'. Therefore the spring 802 applies a force to bias the plunger 738, and in turn the internal pin 260, away from the blade 300'. This forces the plunger 738 towards the locked configuration shown in FIG. 10B. It should be understood that while a number of different exemplary components of locking mechanisms are shown, in various arrangements, the locking mechanism can utilize different components then those shown. For example, in some embodiments, the locking mechanism 800 can include any outer assembly of components which includes at least one socket (e.g. the coupling 710 and sockets 726). The locking mechanism can then include any internal assembly of components which is movable along a central axis of the processing shaft between a first position and a second position (e.g. an internal pin 260) and contacts the ball bearings 728 to cause the ball bearings 728 to lock to the blade 300'. The outer assembly can also include the main shaft 262, which can be arranged concentrically around at least a portion of the internal pin 250 and connected to an end of the coupling 710. In some arrangements, the roles of the outer assembly and internal assembly may also be reversed.

Figure 11A:
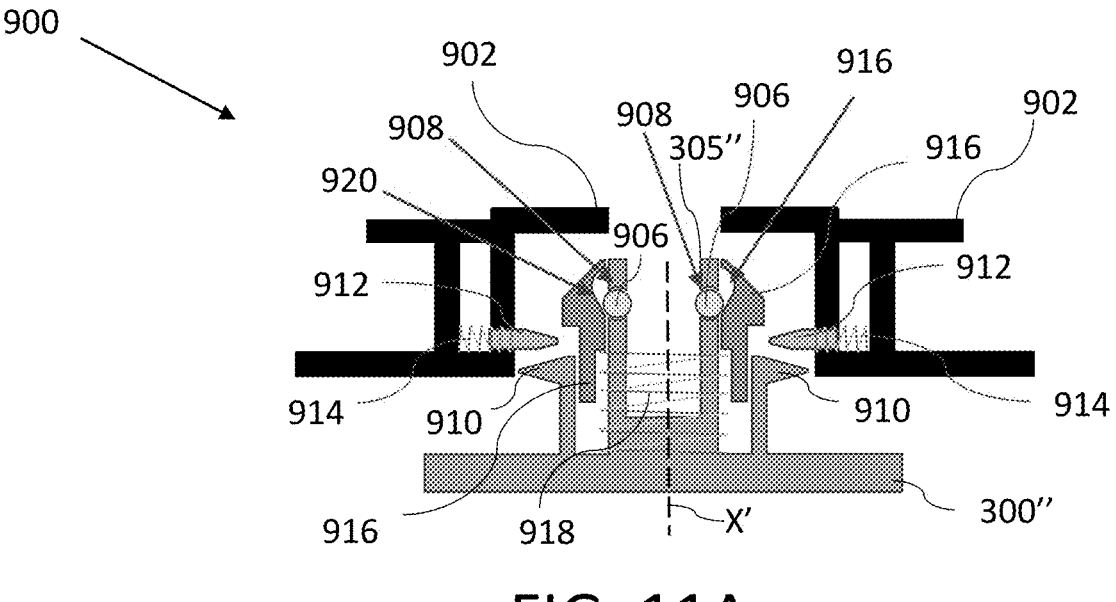
FIGS. 11A-E show another alternate embodiment of a locking mechanism in accordance with this disclosure.
Figure 11B:
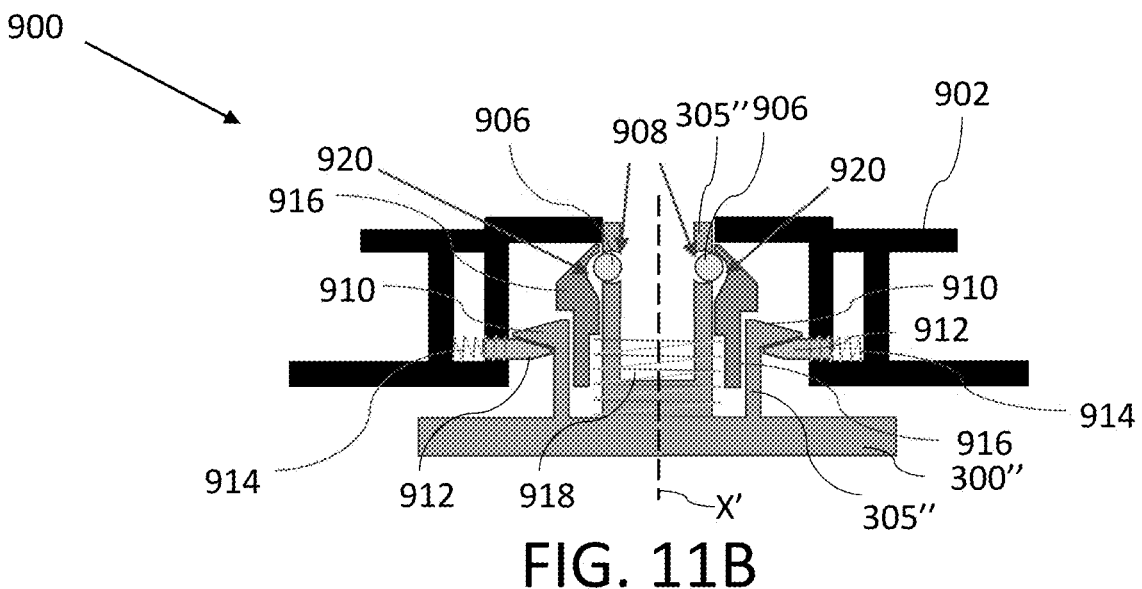
Figure 11C:
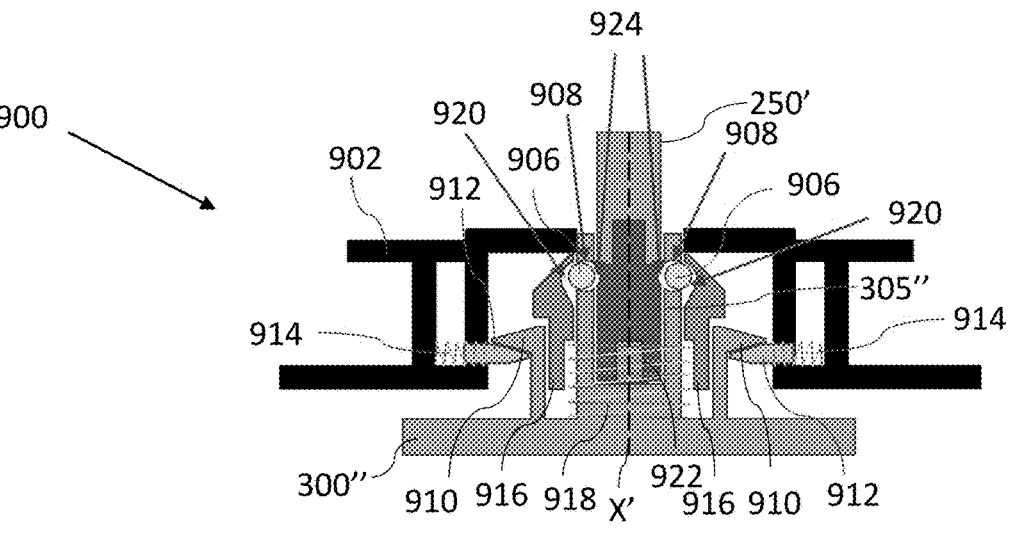
Figure 11D:
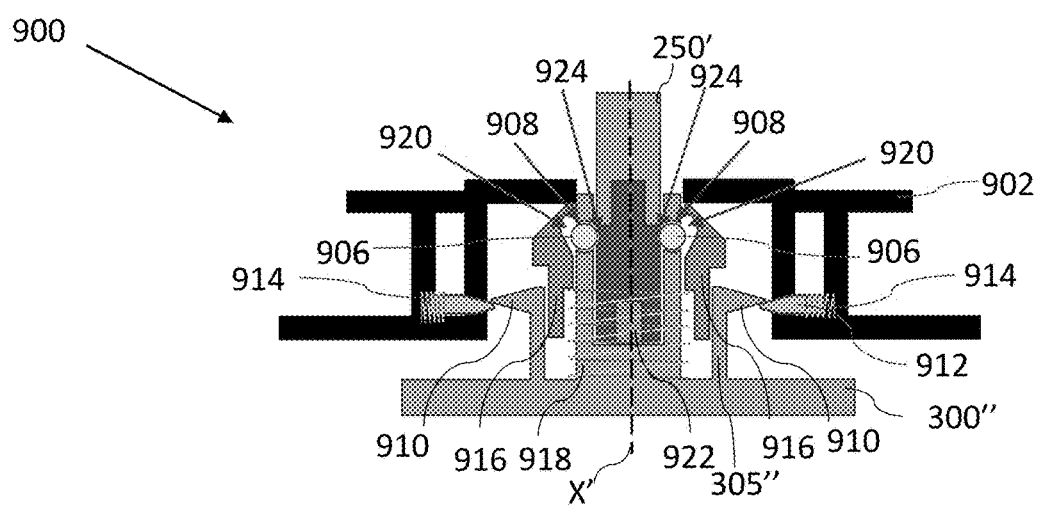
Figure 11E:
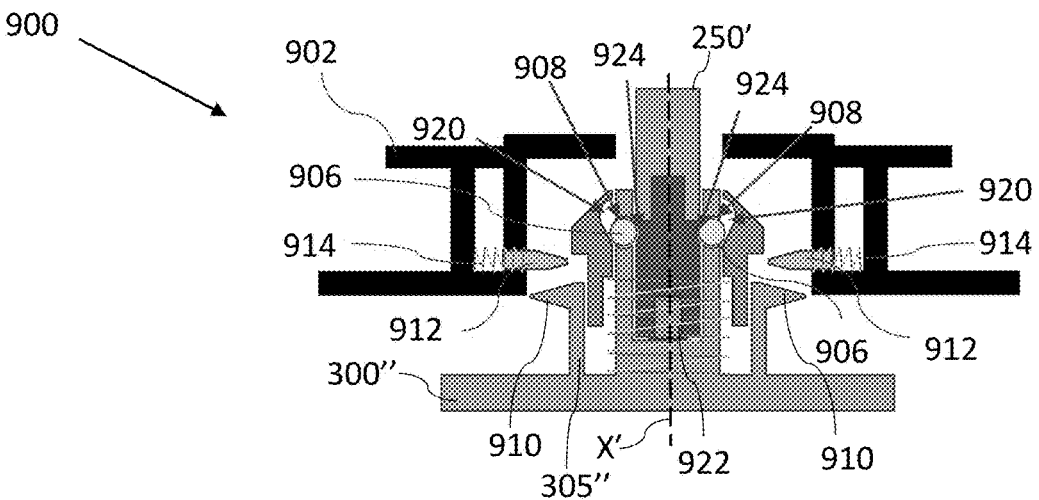

Referring now to FIGS. 11A-11E, another embodiment of a locking mechanism 900 for a food processor, such as the micro puree machine 10, is shown. In general, FIGS. 11A-11E show a progression as a blade 300" is initially attached to a lid 902 (FIGS. 11A-11B) before being locked to a processing shaft 250' (FIGS. 11C-11E). As will be discussed in more detail below, in the locking mechanism 900, the ball bearings 906 are provided as part of the blade 300", and rest within opposing internal cavities 908 of a support hub 305" of the blade 300". It should be understood that the components of the locking mechanism 900 can be similar to those described in other embodiments herein, except as otherwise shown and described.

Referring now to FIGS. 11A-11B, the blade 300" is shown moving from a position where it has not yet been coupled to the lid 902 (FIG. 11A), to a second position where the blade 300" is received within, and coupled to, the lid 902 (FIG. 11B). The blade 300" includes opposing wings 910, extending outwardly from the center (i.e. axis x'). The wings 910 can be on opposite sides of the blade 300" with respect to the center, or can be formed from a single uniform extension spanning an entire circumference of the support hub 305". The lid 902 includes inwardly extending protrusions 912 which engage the wings 910 as the blade 300" is coupled to the lid 902 (i.e. as the blade 300" moves upwardly into the lid 902, along the axis x' in the orientation shown). Each protrusion 912 is biased inwardly, towards the center axis x'. In that regard, in one example, the lid 902 can include springs 914 corresponding to each protrusion 912, the springs 914 biasing the protrusions 912 towards the center axis x'. When the blade 300" is moved upwardly such that the wings 910 pass beyond the protrusions 912, the wings 910 become secured within the interior of the lid 902 as shown in FIG. 11B. In this configuration, the blade 300" is locked to the lid 902 with the protrusions 912 holding the wings 910 and preventing separation. In some cases, the wings 910 can include an angled surface extending outwardly to a pointed tip, to facilitate smoother engagement with the protrusions 912.

The lid 902 also includes a coupling 916 positioned between the wings 910 and the support hub 305". The coupling 916 is movable upwards or downwards (i.e. along the x' axis) and is biased by a spring 918 to move upwards and away from the bottom of the blade 300". The coupling 916 includes sockets 920, corresponding to the internal cavities 908 of the blade 300", which can have a concave shape, corresponding to a convex shape of the ball bearings 906. As the blade 300" moves upwards within the lid 902, the coupling 916 comes in contact with a surface of the lid 902 which forces the coupling 916 downwards along the support hub 305" of the blade 300". This causes the internal sockets 920 of the coupling 916 to align with the internal cavities 908 of the blade 300", and allows the ball bearings 906 to move outward from the center axis x' to rest, at least partially, within the sockets 920. This is an unlocked configuration, as the ball bearings 906 are free to move within the sockets 920 and cavities 908.

Referring now to FIGS. 11C-11E, configurations of the blade 300" as it is locked to a processing shaft 250' of a micro puree machine 10 are shown. In FIG. 11C, the processing shaft 250' is inserted into the support hub 305" of the blade 300". A magnet 922 within the shaft 250' initially removably couples the blade 300" to the processing shaft 250' through magnetic force. The processing shaft 250' has one or more internal recesses 924, corresponding to the internal cavities 908 of the ball bearings 906 which provide another area within which the ball bearings 906 may move.

However, in the configuration shown in FIG. 11C, the ball bearings 906 are free to move and the blade 300" is still not locked to the processing shaft 250'. In that configuration, the blade 300" can be easily removed by overcoming the force from the magnet 922.

To lock the blade 300" to the shaft 250', the processing shaft 250' is then pushed downwards, forcing the wings 910 to contact protrusions 912 and compress springs 914 outwardly (FIG. 11D). As shown in FIG. 11E, the wings 910 eventually overcome the biasing force of the springs 914 and pass over the protrusions 912 as the blade 300" is pushed downwards. The blade 300" moves away from the lid 902, such that the coupling 916 is no longer in contact with the lid 902. This allows the spring 918 to bias the coupling 916 upwards. As the coupling 916 moves upwards, sockets 920 are forced upwards and no longer align with the ball bearings 906 and cavities 908 of the blade 300'. The concave shape of the sockets 920 urge the ball bearings 906 towards the center until a narrower internal diameter of the coupling 916 comes in contact with the ball bearings 906, holding the ball bearings 906 inwards into the internal cavities 908 and recesses 924 of the processing shaft 250'. In this configuration, the blade 300" has moved away from the lid 902, and the blade 300" is locked to the processing shaft 250' by the ball bearings 906 such that it can be rotated for processing food.

To remove the blade 300" the processing shaft 250' can be moved upwards, back into the configuration shown in FIG. 11C, unlocking the locking mechanism 900. In the unlocked configuration, the lid 902 forces the coupling 916 down until the sockets 920 align with the internal cavities 908 and ball bearings 906. The ball bearings 906 can then move freely out of the recesses 924 of the processing shaft 250' as the shaft 250' moves upwards, and thus, the processing shaft 250' is not locked to the blade 300".

The locking mechanism 900 has a number of advantages. First, many of the components of the locking mechanism 900 are coupled to the blade 300", such as the ball bearings 906 and coupling 916. Since the blade 300" is easily removable, these components can also be easily removed for cleaning. Additionally, if a locking mechanism 900 is faulty, or breaks, the locking mechanism 900 can easily be replaced by replacing the blade 300". This makes shipping a replacement part to a consumer easy, as it avoids the need to replace the entire processing shaft 250', as in embodiments where the locking mechanism is integrated within the processing shaft.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

We claim:

1. An automatic locking mechanism for locking a processing shaft to a blade for a food processor, comprising:
  a coupling with at least one socket, the coupling connected to move with one of the blade or the processing shaft; and
  at least one ball bearing, wherein, in a first configuration, each ball bearing is positioned within a corresponding one of the sockets and the blade is not locked to the processing shaft,
  wherein, the processing shaft is configured to move from the first configuration to a second configuration and moving from the first configuration to the second configuration causes each ball bearing to move from the corresponding one of the sockets into one of a corresponding cavity of the blade or a recess of the processing shaft, thereby locking the blade to the processing shaft.

2. An automatic locking mechanism for locking a processing shaft to a blade for a food processor, comprising:
  an outer assembly of the processing shaft including at least one socket, and at least one ball bearing, each ball bearing positioned within one of the sockets; and
  an internal assembly of the processing shaft including one or more components configured to move along a central axis of the processing shaft between a first configuration, where the locking mechanism is in an unlocked configuration, and a second configuration, where the locking mechanism is in a locked configuration, including at least one wing sloping outwardly from the central axis,
  wherein as the one or more components of the internal assembly move from the first configuration to the second configuration, the at least one wings each engage at least one of the ball bearings, forcing the at least one ball bearing into a corresponding internal cavity of the blade that surrounds one of the sockets such that each ball bearing is within both one of the sockets and one of the internal cavities, thereby locking the blade to a coupling.

3. The automatic locking mechanism of claim 2, wherein the internal assembly includes:
  an internal pin configured to move along the central axis between the first configuration and the second configuration, and
  a plunger coupled to the internal pin and configured to move along the central axis therewith, wherein the plunger includes the at least one wing,
  wherein as the internal pin moves from the first configuration to the second configuration, the internal pin forces the at least one wings each engage at least one of the ball bearings.

4. The automatic locking mechanism of claim 3, wherein the outer assembly includes:
  an outer shaft arranged concentrically around at least a portion of the pin and connected at one end to a coupling, the coupling including the at least one socket.

5. The automatic locking mechanism of claim 4, wherein:
  the coupling defines an internal chamber around the plunger; and
  the ball bearings are biased into the internal chamber of the coupling such that in the unlocked configuration, the ball bearings are at least partially within the internal chamber of the coupling.

6. The automatic locking mechanism of claim 2, wherein:
  the at least one ball bearing includes two ball bearings;
  the at least one socket includes two sockets on opposing sides of the central axis; and
  the at least one internal cavity includes two internal cavities on opposing sides of the central axis.

7. The automatic locking mechanism of claim 2, wherein each of the internal cavities of the blade has a concave shape, corresponding to a convex shape of the ball bearings.

8. The automatic locking mechanism of claim 2, wherein each of the at least one wings have a sidewall with a concave shape, corresponding to a convex shape of the ball bearings.

9. The automatic locking mechanism of claim 2, further comprising at least one magnet retained within the coupling and proximate the blade, wherein the at least one magnet applies a magnetic force to removably retain the blade to the processing shaft in the unlocked configuration.

10. The automatic locking mechanism of claim 3, further comprising:
  a main shaft arranged around the internal pin;
  an extension member coupled to the internal pin; and
  a spring positioned within an internal chamber of the main shaft and arranged around the internal pin, wherein, in the unlocked configuration, the spring applies a force to move the internal pin into the locked configuration.

11. The automatic locking mechanism of claim 3, further comprising:
  a spring positioned between an end of the plunger and the blade, wherein the spring applies a force between the plunger and the blade such that, in the unlocked configuration, the force from the spring causes the internal pin to move into the locked configuration.

12. The automatic locking mechanism of claim 2, wherein the ball bearings are a rigid material.

13. An automatic locking mechanism for locking a processing shaft to a blade for a food processor, comprising:
  at least one ball bearing positioned within an internal cavity of the blade;
  at least one recess within the processing shaft, each recess configured to align with an internal cavity of the blade when the processing shaft and blade are coupled; and
  at least one coupling around the blade, the coupling including at least one socket configured to contain a corresponding one of the ball bearings,
  wherein:
    in a first configuration, the sockets align with the internal cavities of the blade; and
    as the locking mechanism moves from the first configuration to a second configuration, the coupling forces each of the ball bearings into one of the recesses of the processing shaft, locking the processing shaft to the blade in the second configuration.

14. The automatic locking mechanism of claim 13, further comprising a spring positioned between the coupling and the blade, the spring configured to bias the coupling away from the blade along a central axis of the processing shaft.

15. The automatic locking mechanism of claim 13, further comprising a lid configured to receive the blade, wherein the lid includes at least one protrusion biased inwardly,
  wherein the blade comprises at least one outwardly extending wing configured to engage the protrusions as the blade is received by the lid such that the at least one wing opposes a biasing force on the protrusions.

16. The automatic locking mechanism of claim 15, wherein when the blade is received within the lid, the protrusions retain the wings within the lid, coupling the blade to the lid.

17. The automatic locking mechanism of claim 15, wherein each of the protrusions is biased inwardly by a corresponding spring.

18. The automatic locking mechanism of claim 15, wherein the at least one wing includes an angled surface extending outwardly to a pointed tip to engage the protrusions.

19. The automatic locking mechanism of claim 13, wherein the coupling has a narrower inner diameter between the at least one socket and the blade, the narrower inner diameter forcing the ball bearings into the recesses of the processing shaft in the second configuration.

20. The automatic locking mechanism of claim 13, wherein each of the sockets has a concave shape, corresponding to a convex shape of the ball bearings.

* * * * *